June 23, 1959 A. E. JOEL, JR., ET AL 2,892,184

IDENTIFICATION OF STORED INFORMATION

Filed March 11, 1955 8 Sheets-Sheet 1

INVENTORS A. E. JOEL, JR.
J. J. YOSTPILLE

BY William F. Simpson.

ATTORNEY

INVENTORS A. E. JOEL, JR.
J. J. YOSTPILLE
BY William F. Simpson
ATTORNEY

June 23, 1959 A. E. JOEL, JR., ET AL 2,892,184

IDENTIFICATION OF STORED INFORMATION

Filed March 11, 1955 8 Sheets-Sheet 3

INVENTORS A. E. JOEL, JR.
J. J. YOSTPILLE

BY William F. Simpson.

ATTORNEY

IDENTIFICATION OF STORED INFORMATION

Filed March 11, 1955 8 Sheets-Sheet 4

INVENTORS A. E. JOEL, JR.
J. J. YOSTPILLE
BY William F. Simpson
ATTORNEY

IDENTIFICATION OF STORED INFORMATION

Filed March 11, 1955 8 Sheets-Sheet 5

INVENTORS A. E. JOEL, JR.
J. J. YOSTPILLE
BY William F. Simpson
ATTORNEY

IDENTIFICATION OF STORED INFORMATION

Filed March 11, 1955 8 Sheets-Sheet 6

INVENTORS A. E. JOEL, JR.
J. J. YOSTPILLE
BY William F. Simpson
ATTORNEY

IDENTIFICATION OF STORED INFORMATION

Filed March 11, 1955 8 Sheets-Sheet 7

INVENTORS A.E. JOEL, JR.
J.J. YOSTPILLE

BY William F. Simpson.

ATTORNEY

IDENTIFICATION OF STORED INFORMATION

Filed March 11, 1955 8 Sheets-Sheet 8

16 POINT SCANNER

11 POINT SCANNER

INVENTORS A. E. JOEL, JR.
J. J. YOSTPILLE
BY William F. Simpson.
ATTORNEY

United States Patent Office 2,892,184

Patented June 23, 1959

2,892,184

IDENTIFICATION OF STORED INFORMATION

Amos E. Joel, Jr., South Orange, and John J. Yostpille, Livingston, N.J., assignors to Bell Telephone Laboratories, Incorporated, New York, N.Y., a corporation of New York

Application March 11, 1955, Serial No. 493,721

28 Claims. (Cl. 340—174)

Figure 1:
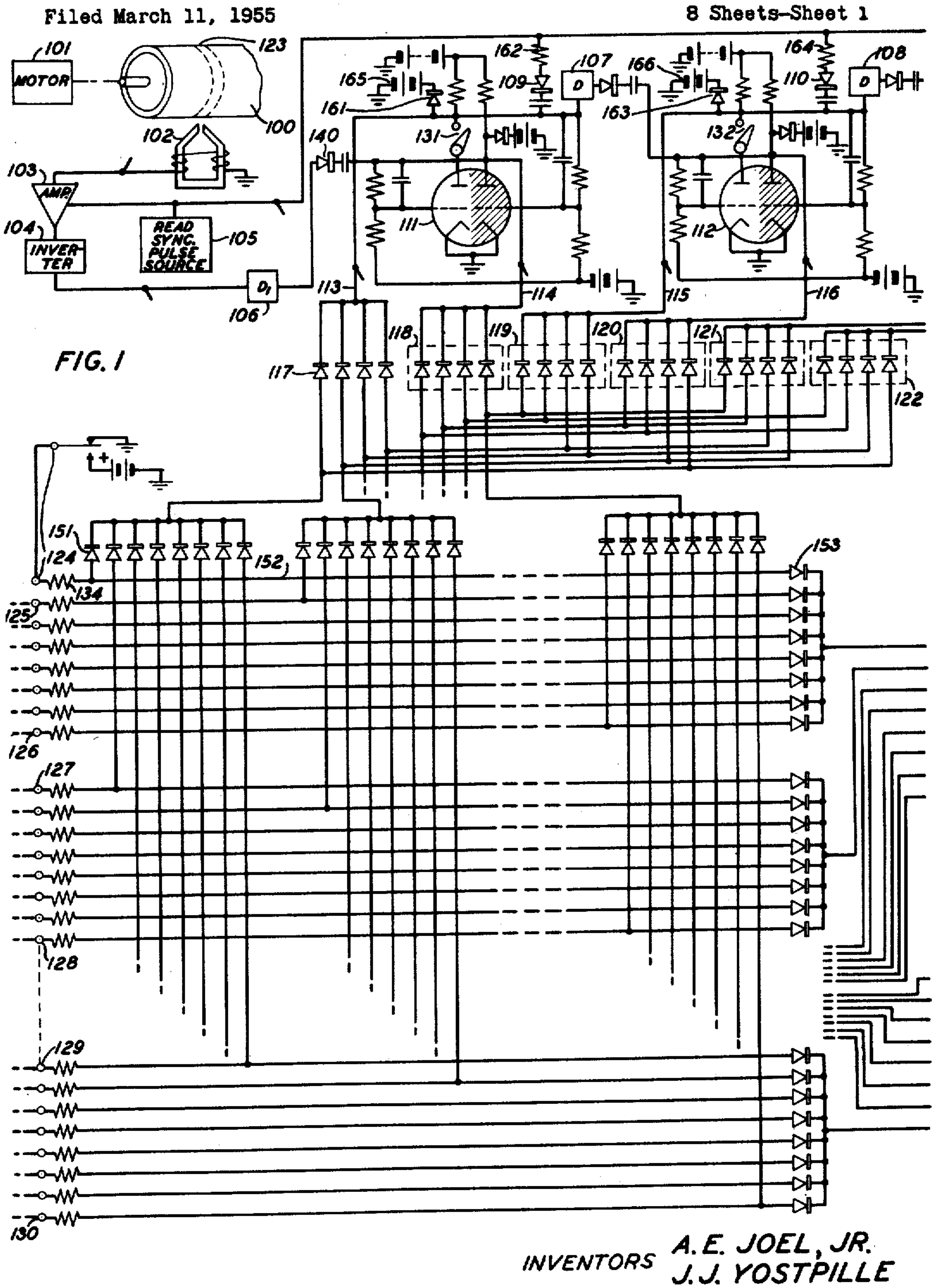

This invention relates to improved methods, circuits and apparatus for uniquely identifying each of a plurality of items by means of a single binary digit or bit individually associated with each of the items to be identified. The items to be identified are arranged in a predetermined order and the identity of each item uniquely determined by examining the binary digit or bit associated with individual ones of predetermined ones of said items when said items are arranged in said predetermined order.

In the exemplary embodiments described herein the identity of each of a plurality of words or stored items is uniquely identified by associating with each of said items or words a single binary digit or bit which has either one or the other of two different recognizable characteristics. A plurality of such additional binary bits or digits from a group of words are employed to uniquely identify each of the words or items.

In storage devices such as employed in communication systems, computing systems and the like, it is usually necessary to uniquely identify each of a group of storage items; each of the storage items usually comprises a group of digits sometimes called a word or words.

For magnetic drum storage devices, delay line storage devices and similar types of storage devices, two methods have been employed in the past to identify the words comprising the storage item. In one arrangement a starting point is frequently designated and the number of digits or the number of words counted. Such count is then employed to uniquely identify each of the digits or words or both of all of the storage items. In such an arrangement it is necessary to accurately count all of the digits or storage items and if one item is not properly counted or if extra pulses are encountered the various words or storage items will thereafter be improperly identified at least until the counting mechanism is restored by the starting indication. Another arrangement previously employed comprises adding sufficient digits to each of the storage items or words to uniquely identify such items or words. This arrangement has the disadvantage that where an appreciable number of storage items are required the number of digits added to each word becomes relatively large so that the storage capacity must be greatly increased or the number of items stored in a storage device of a given capacity materially reduced.

An object of the present invention is to provide a method, means and apparatus for uniquely identifying each of a large plurality of storage items which requires only a single binary digit to be associated with each of the storage items. A different plurality of said associated binary digits is employed to identify each of the storage items.

The present invention is not limited to the binary number system, and may be employed with other number systems. However, the specific embodiment described herein employs the binary number system, since it permits the present invention to be readily described, explained, and understood.

It has been discovered that a plurality of numbers of a predetermined number of digits $n$ may be arranged in predetermined sequences such that any one digit as, for example, the last digit of predetermined ones of $n$ of the numbers in said sequence are the same as the digits of the number in question. Consequently, it is only necessary to examine in some manner or determine the identity of said one digit of said $n$ numbers. In other words, it is only necessary to add said one digit to each of the information items stored and then examine or determine the identity of said predetermined digit of predetermined ones of said numbers in said sequence. In the exemplary embodiment of this invention described herein, such sequences of binary numbers are described. One digit as, for example, the last digit of such numbers is associated with or appended to each of the words or information items to be identified.

A further object of this invention is to supply such binary bits to a shift register; the setting of the shift register at any instant of time after $n$ digits or bits have been entered therein uniquely identifies one of the words or information items in said sequence. Thus when the circuits fail to properly respond to a pulse, or when a spurious pulse is received proper synchronism is established $n$ pulses later.

An elementary series of such numbers is illustrated by the following two-digit binary numbers:

| | |
|---|---|
| 0 | 1 |
| 1 | 1 |
| 1 | 0 |
| 0 | 0 |

If the above series of numbers are written on a loop of tape then considering for example, the second line of two ones, it is noted that the last digits of the first two numbers are likewise two ones. Considering the third line, if one reads the numbers from left to right, one reads a one and a zero. Likewise, the last digits of the second and third numbers reading down are one and zero. Thus the identity of each of the lines may be obtained equally well from reading the numbers in that line or by reading the last digit of the number immediately preceding the number and the last digit of the number. Thus if the last digits of the numbers are inserted in a two-stage shift register, the setting of the shift register at all times will uniquely identify each of the lines and only one digit of the numbers is required to be entered in the lines and supplied to the shift register. Each of the lines of the table may represent an item of information and such items are each uniquely identified by adding the last digit only of the numbers in the table to the respective lines and then examining two successive ones of said added digits.

Numerous sequences of numbers having the characteristics described above may be devised and arranged and the last digit or some other predetermined digit of the number appended to storage items to uniquely identify each of the storage items in the manner described above.

However, in accordance with another object of this invention, automatic means are provided for automatically generating or obtaining such a sequence of numbers.

In accordance with still another object of this invention, means are provided for automatically generating a sequence of numbers of the type described above and also automatically appending the final digit of the number to the various storage items or storage spaces or slots for the storage items.

In accordance with still another object of this invention, means are provided for automatically checking a sequence of numbers having the above-described properties which are automatically generated or obtained having the final digit associated with the various storage items or storage slots, words or storage means.

A feature of the invention relates to arranging storage items or information in groups and employing one series of numbers having the characteristics described above for identifying each item in the group and another series of numbers having the above-described characteristics for identifying the groups of items. In each case only a single binary digit or bit is associated with or appended to the storage items or included in the groups of storage items for identifying the storage items. Another such binary digit or bit is likewise appended to or included in each of the groups of items so that said second digit may be employed to uniquely identify each of the groups of items. In this case, the appended binary digits are delivered to two different shift registers. One shift register receives the first group of binary digits for identifying the particular items of the group while a second shift register receives the binary digits included in the group for identifying the groups of storage items.

It has also been discovered that while it is possible to arrange numbers in sequences having the properties described above, it is possible to arrange such numbers in more than one such sequence and to arrange a group of such numbers so as to have subgroups within a larger group. As a result, when information is arranged in groups of items, it is not necessary that each group of items have the same number of items in the group. Different groups may have different numbers for items and still the various items in each of the groups may be uniquely identified by adding only a single binary digit or bit to each item.

It is therefore still another object of this invention to provide means for identifying individual items of groups of items wherein the number of items in the different groups may vary by means of adding a binary digit to each of the items and entering said binary digits from a plurality of the items in a shift register and employing the output of the shift register to uniquely identify some one of the items in the groups which item bears some predetermined relationship with one or more of the binary digits added to the items.

Figure 1A:
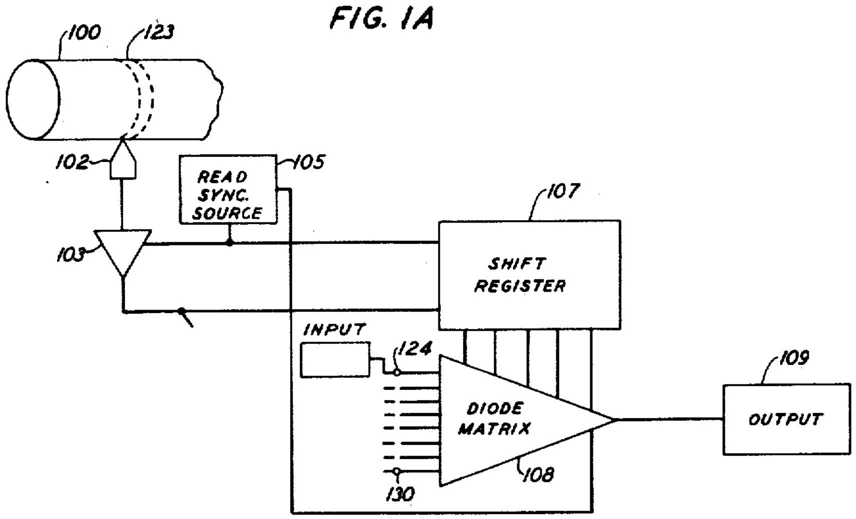
Figure 3A:
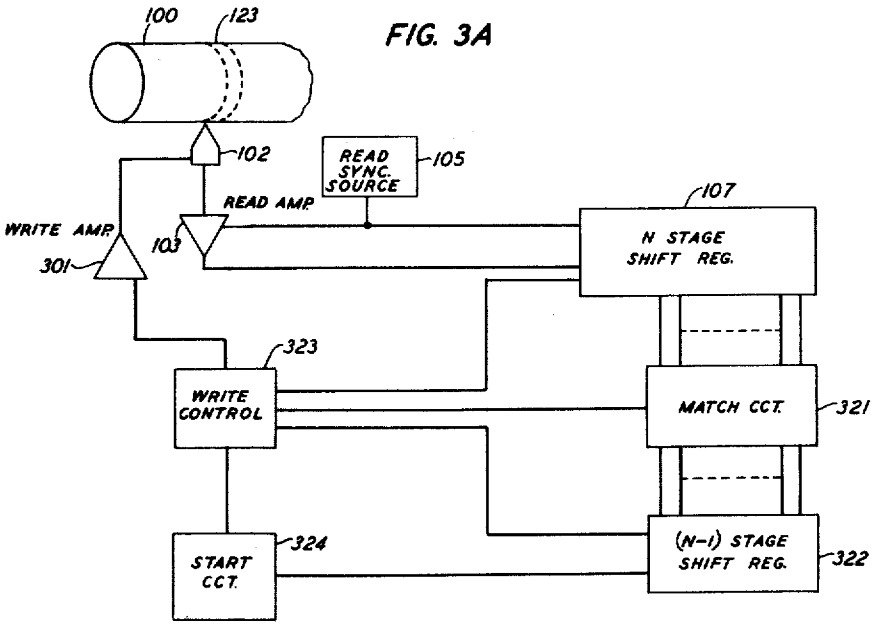
Figure 2:
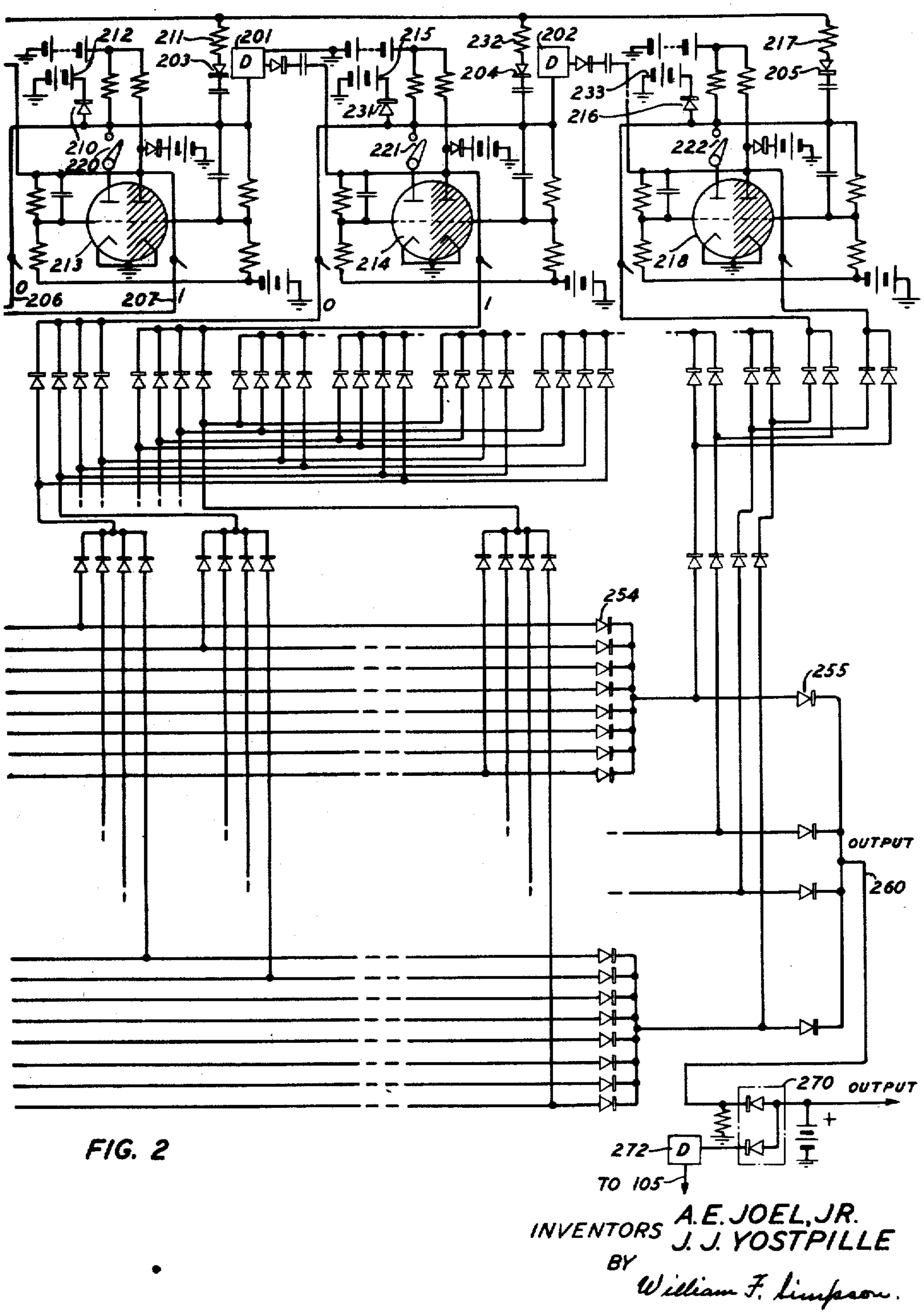
Figure 3:
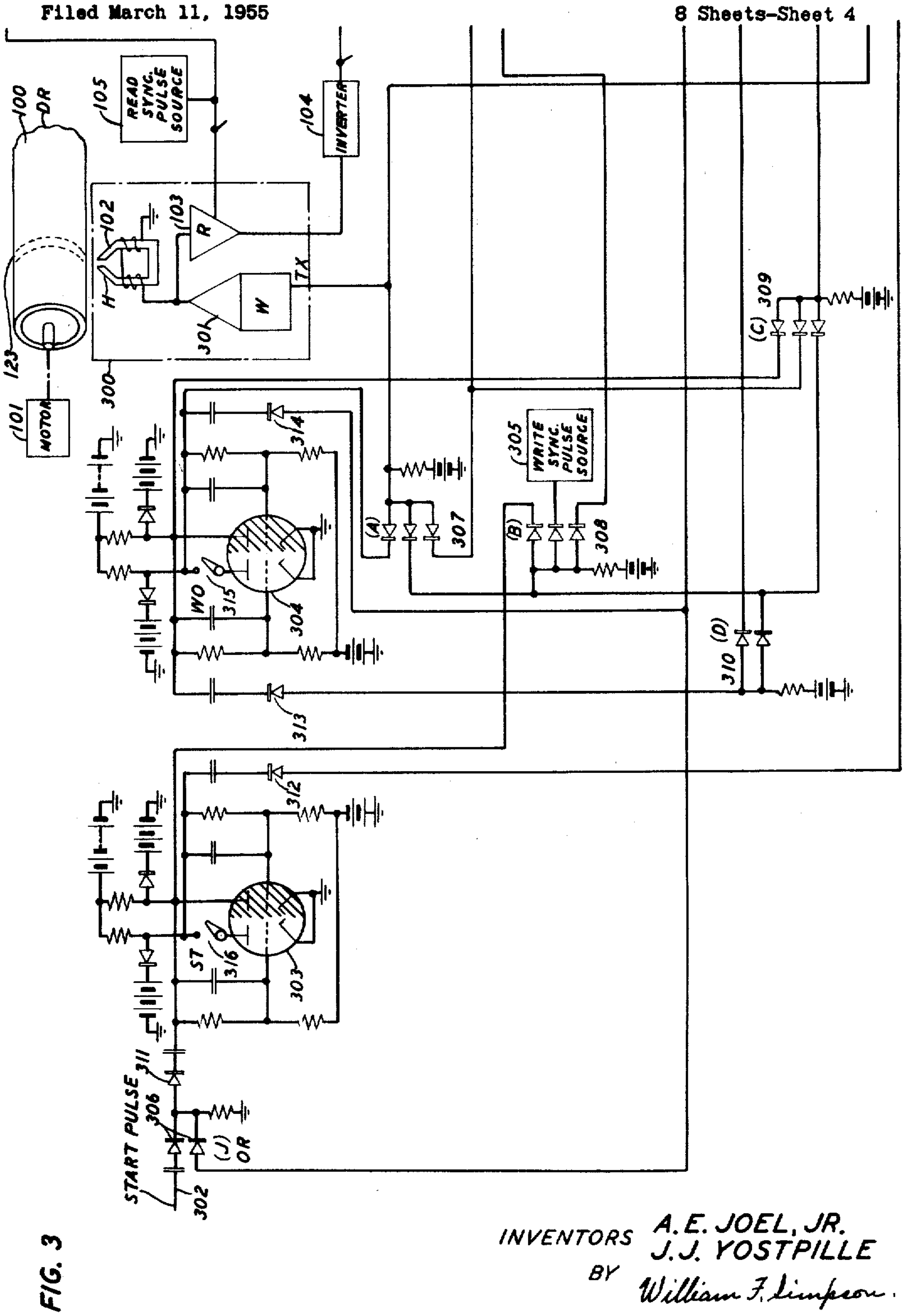
Figure 4:
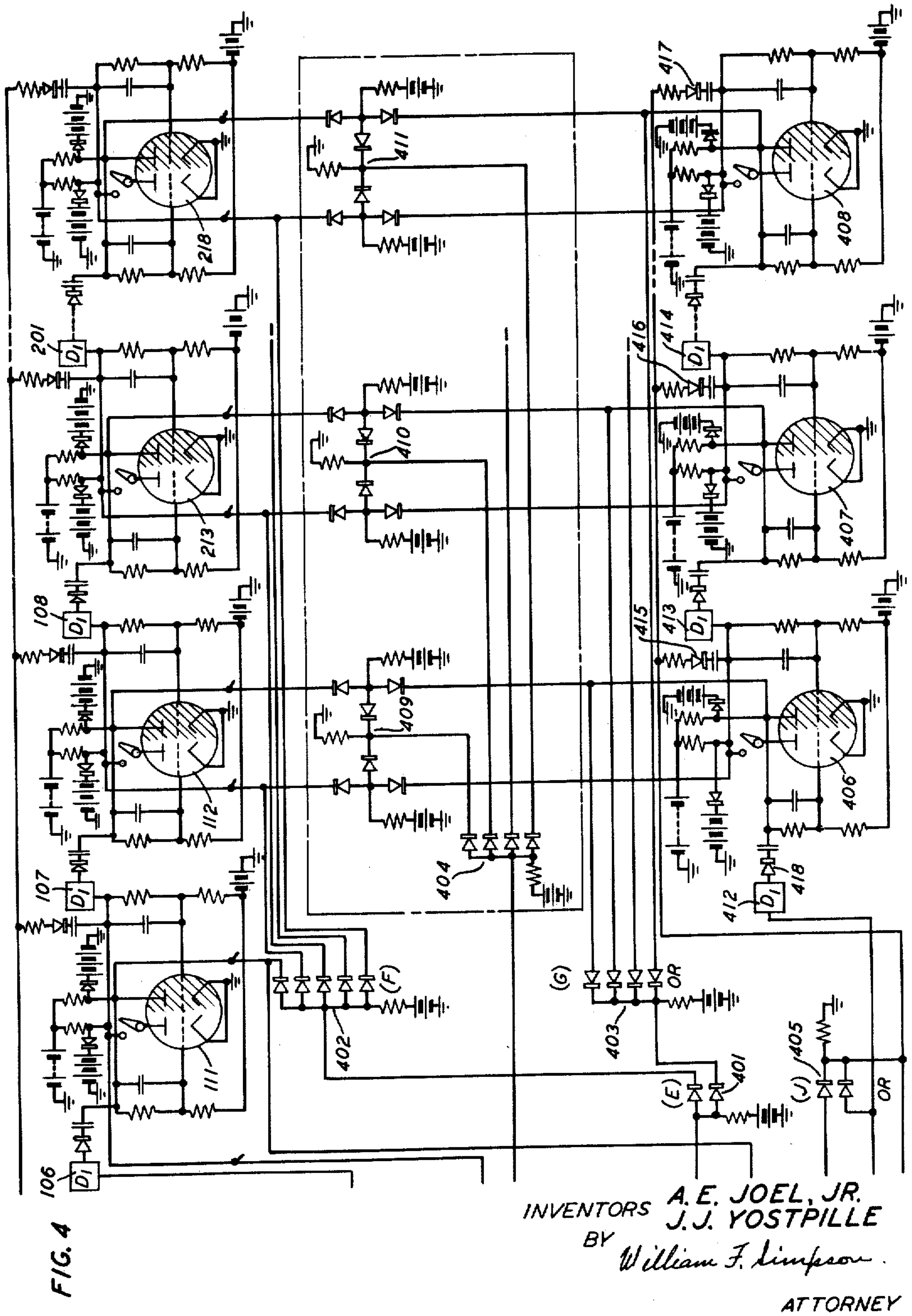
Figure 5:
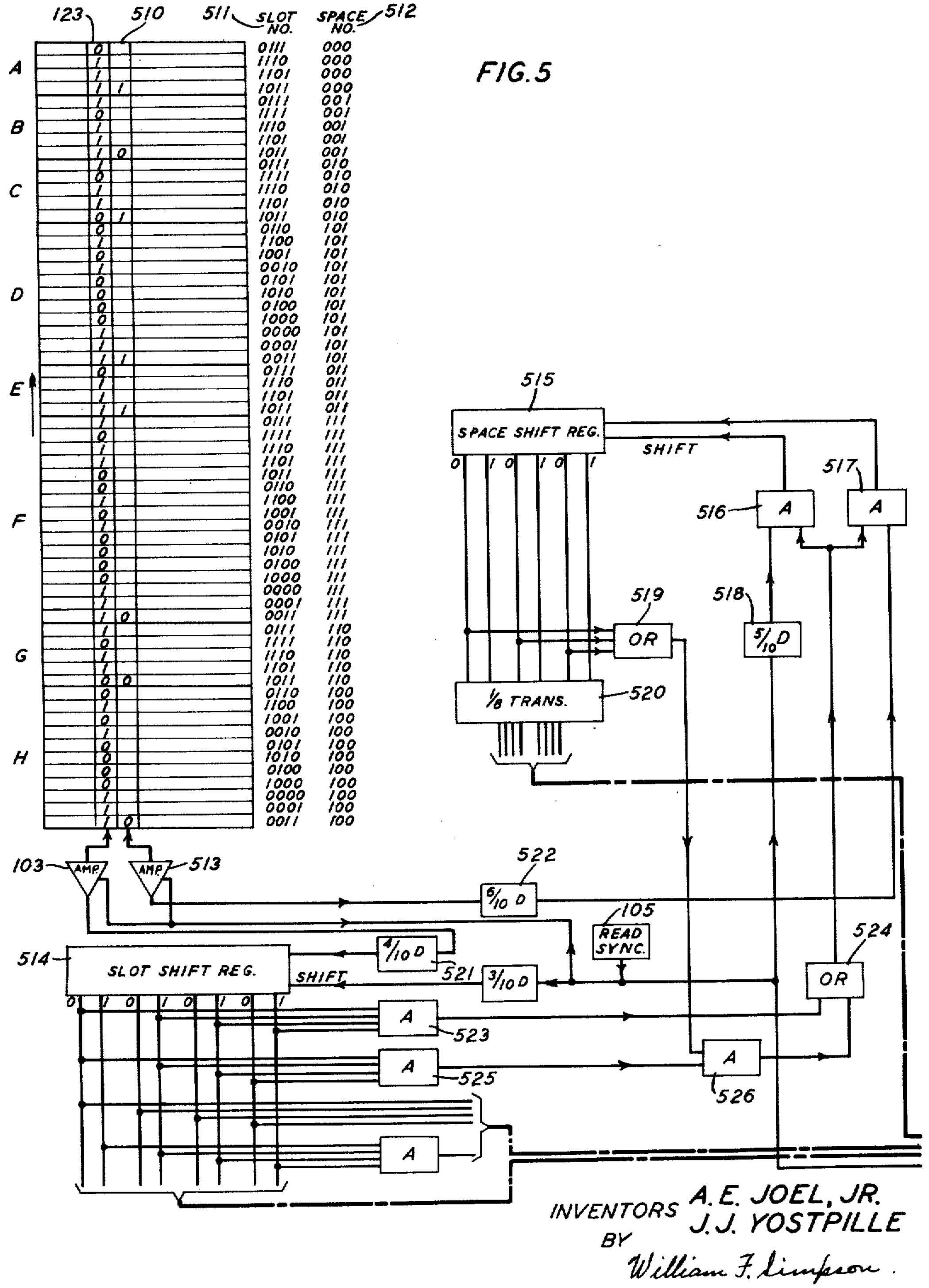
Figure 6:
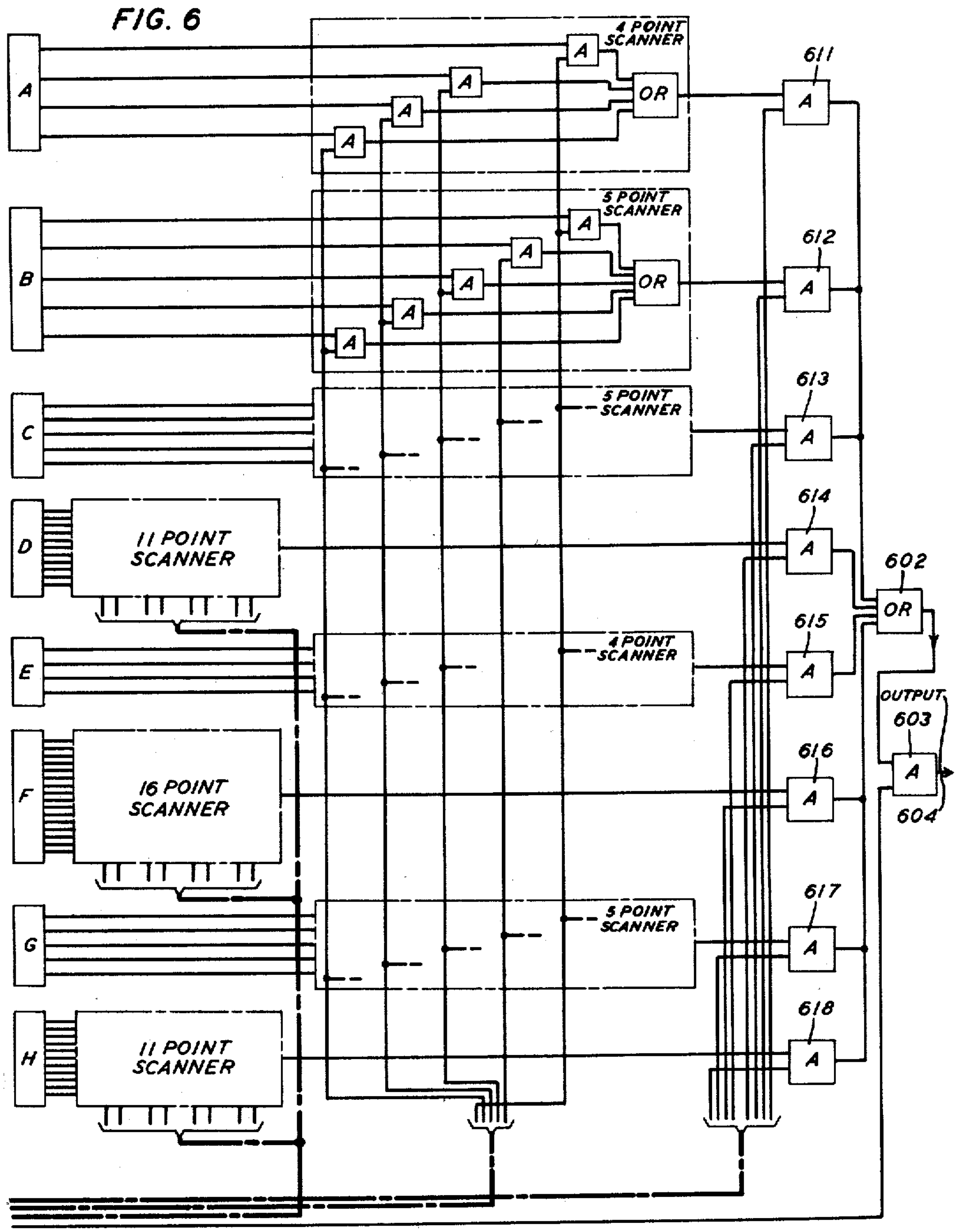
Figure 7:
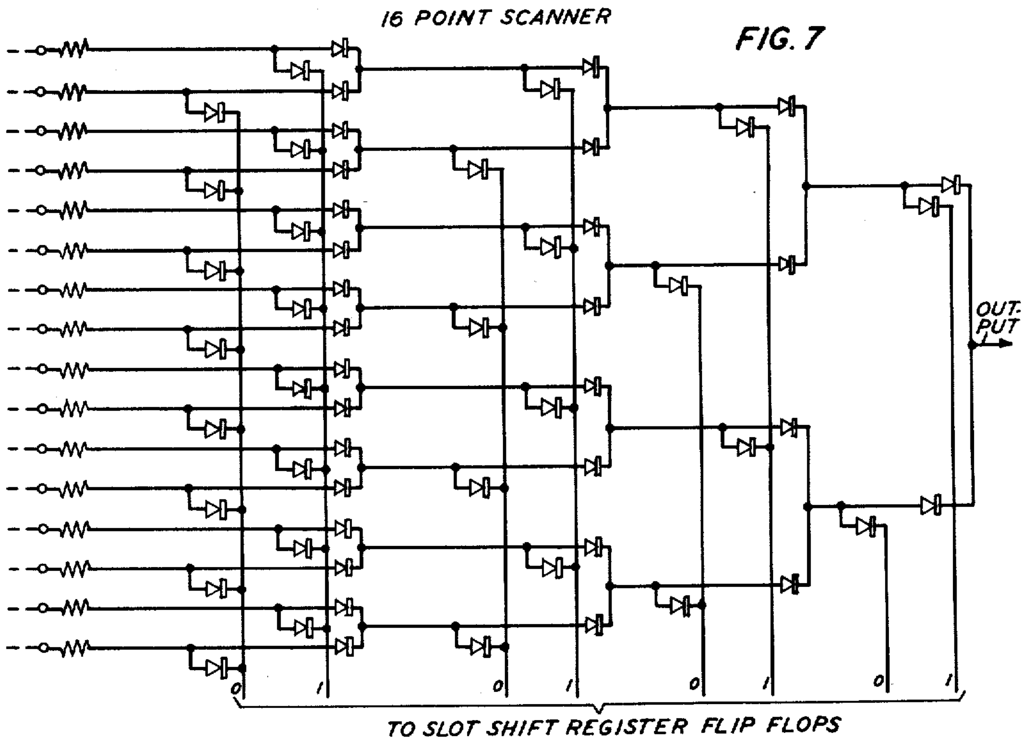
Figure 8:
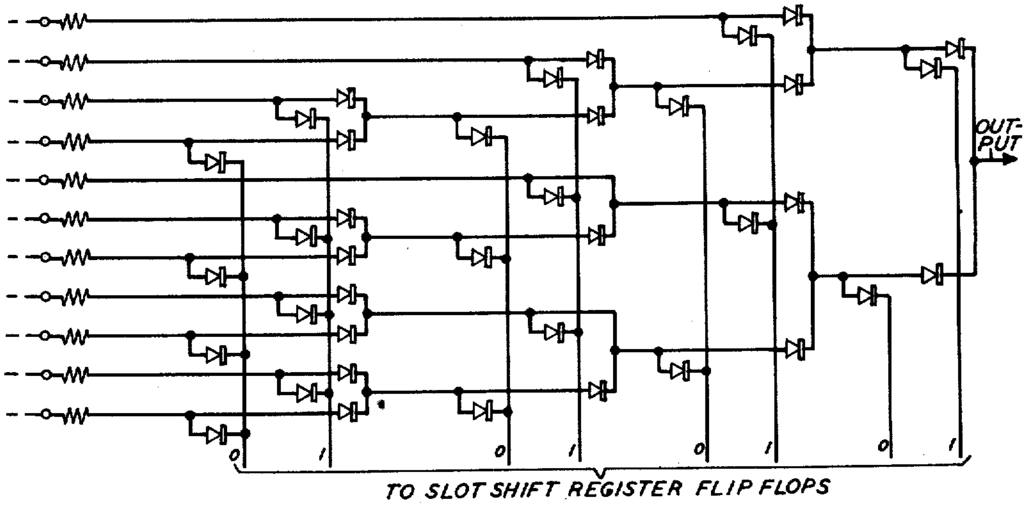

The foregoing objects and features of this invention may be more readily understood from the following description when read with reference to the attached drawing in which:

Fig. 1A shows a block diagram of the various elements of an exemplary embodiment of this invention and the manner in which these elements cooperate to uniquely identify each of a plurality of slots on a magnetic drum;

Figs. 1 and 2, with Fig. 2 arranged to the right of Fig. 1, show details of circuits and equipment whereby each of a plurality of slots on a magnetic drum may be uniquely identified by one binary digit in each of the slots with digits arranged in a track or channel around the drum. While the invention is not limited to identifying storage items, words or slots of a magnetic drum, a specific embodiment described herein is arranged to cooperate with the circuits and apparatus of such a magnetic drum;

Fig. 3A shows a block diagram of the elements of an exemplary embodiment of this invention and the manner in which they cooperate to automatically generate and store an identifying sequence of binary bits or digits;

Figs. 3 and 4, with Fig. 4 arranged to the right of Fig. 3, show details of circuits, apparatus, equipment and means for automatically generating a sequence of numbers having the above-described characteristics and for automatically entering the last digit of such numbers in one channel around a magnetic storage drum whereby each of the storage slots may be uniquely identified;

Figs. 5 and 6, with Fig. 6 arranged to the right of Fig. 5, show the manner in which a plurality of groups of storage items may be identified. Here again, the specific embodiment described herein is arranged to cooperate with the circuits and equipment of a magnetic storage drum. The invention is not so limited. In addition, the equipment has been arranged to uniquely identify the various storage items in each of the groups wherein the number of items in different ones of the groups is different;

Fig. 7 shows details of a diode matrix scanner suitable for use as the 16-point scanner shown in Fig. 6; and Fig. 8 shows the details of a similar diode matrix scanner which is suitable for use as the 11-point scanner shown in Fig. 6.

Fig. 1A shows in outline form the various elements of an exemplary embodiment of this invention for uniquely identifying each of a plurality of slots on a magnetic drum in response to a single binary bit stored in each of the slots on the drum when these bits are arranged in a predetermined order or sequence. The magnetic drum 100 has recorded therein an identifying sequence of binary bits or digits, one in each slot on the drum. The pick-up head or device 102 responds to the identifying sequence of digits stored in the track 123. From the pick-up device these signals are transmitted through the amplifier 103 to a shift register 107. A source of read synchronizing pulses 105 is also connected to the amplifier 103 and to the shift register 107. The synchronizing pulses are employed for pulse timing, correcting, and shaping by the amplifier 103 and they are employed to shift the signals stored in a shift register 107 one stage in response to each of the synchronizing pulses.

The number of stages provided in the shift register 107 is determined by the number of slots to be identified on the magnetic drum 100. The number of slots which may be identified by $n$ stages is $2^n$. Thus if eight stages are provided in the shift register 107, 256 slots around the drum may be uniquely identified, whereas if only four stages are provided then sixteen slots around the drum may be uniquely identified. In any case only a single track having one identifying signal in each slot is provided on the drum 100.

These identifying digits are serially transmitted to the shift register 107, and the output of the shift register applied to the diode switching matrix 108. This matrix is employed to select any one of a large plurality of input devices connecting the input terminals 124 through 130 to an output circuit 109. Thus the input devices may be lines or transmission circuits or switching devices having information which is to be recorded in predetermined individual ones of the slots on a magnetic drum. When the various slots are uniquely identified as described herein by each sequence of $n$ digits from the identifying track as stored in the shift register 107, the output of the shift register 107 energizes the diode matrix 108 so that the corresponding one of the input devices connected to one of the input terminals, such as 124, controls the output circuit 109. This output circuit in turn may be employed to record additional information in the identified slot on the drum 100. This output device also may be employed to change the recorded information or read the information previously recorded in the identified slot in any suitable known manner.

Figs. 1 and 2 with Fig. 1 positioned to the left of Fig. 2 show in detail an exemplary embodiment of this invention wherein provision is made for uniquely identifying 256 slots or positions around a magnetic drum. In addition, means are shown for utilizing the information representing the identity of such slots or positions around the magnetic drum.

As shown in Fig. 1, the magnetic drum 100 is driven by motor 101, which motor in most exemplary embodiments of the invention will be continuously driven and may include two or more motors operated from different power sources so arranged that if power from one source fails the drum will be continuously rotated by another motor switched into operation by failure of the first motor. As represented in Fig. 1, one of the tracks 123 around the magnetic drum 100 is assumed to have recorded therein a series of binary digits arranged in the manner described herein. In the embodiment described with reference to Figs. 1 and 2, it is assumed that an 8-stage shift register is employed which is capable of uniquely identifying each of 256 slots or items of information upon the drum. It is also assumed that the 256 slots or items of information completely fill the circumference of the drum so that the last number or digit of the sequence for such an arrangement described herein lies adjacent the slot of the first digit of the sequence. This number or series of digits may be determined and recorded in the track 123 of drum 100 in any suitable manner. An exemplary arrangement for so recording the number is described herein.

Pick-up device 102 is located adjacent to track 123 and receives the digits of this number in sequence and applies them to the reading amplifier 103. A source of synchronizing pulses 105 is also provided for controlling the amplifier 103. The synchronizing pulses 105 are usually obtained from a control track or other sources of pulses controlled by or operated at the same speed as the drum 100. The ultimate source of the synchronizing signals 105 may operate at the same speed as the drum 100 or at any speed accurately proportional to the speed of the drum 100 so that the reading synchronizing pulses obtained from the source 105 always occur at an accurately determined time during the time any spot or elemental area of the track 123 of each of the slots has a predetermined relationship with pick-up device 102 as it passes under said pick-up device 102. The output of amplifier 103 passes through a phase inverter which changes the polarity of the signals from this amplifier and applies them through a delay device 106 to an 8-stage shift register. Five of the eight stages are shown in detail in Figs. 1 and 2. The synchronizing pulses from the source 105 are also applied to the shift register. Details of the structure of an exemplary magnetic drum, as well as details of exemplary amplifiers, exemplary sources of synchronizing or tuning pulses and other related apparatus, circuits and equipment are more fully set forth in United States Patent 2,700,148 granted January 18, 1955 to McGuigan, Murphy and Newby and in a patent application of Brooks, Lovell, McGuigan, Murphy, Parkinson, Serial No. 183,636, filed September 7, 1950.

Each stage of the shift register comprises a double stability device which is capable of assuming either one or the other of two separate distinct states and remaining in said state until some signal is applied thereto to change it to the other of two stages. The exemplary embodiment shown in Figs. 1 and 2 employs a double triode vacuum tube for each stage of the shift register. It is to be understood however that other types of shift registers employing other electronic devices such as one, two or more transistors, gas tubes, ferrite cores or other similar two-state devices may be employed for each stage of the shift register.

Each of the synchronizing pulses from the source 105 is applied to the left-hand section of the tubes of each of the stages of the shift register. In the exemplary embodiment of this invention described herein it is assumed that these shift pulses are of positive polarity and are of relatively short duration as compared with the frequency or time interval between the pulses.

In the normal condition of each of the stages of a shift register in Figs. 1 and 2, the right-hand tube or section is conducting with the result that the anode of the right-hand section is at a relatively low voltage, while the anode of the left-hand section is at a relatively high positive voltage. In order to insure that the right-hand section becomes conducting when power is applied to the system, anode voltage is first applied to the right-hand anodes and then the switches 131, 132, 220, 221, 222, etc. are closed.

Positive read synchronizing pulses from source 105 are applied through the respective diodes 109, 110, 203, 204, 205, etc., to the grids of the right-hand sections of the respective tubes 111, 112, 213, 214 and 218 and to the corresponding grids of the other three stages not shown. The positive pulses applied to these grids tend to cause the right-hand sections of the tubes to be conducting if they are not in a conducting state and the left-hand sections in turn become nonconducting. If the right-hand section is already conducting and the left-hand section nonconducting, the positive synchronizing pulse applied to the left-hand anode and right-hand grid is not effective. The left-hand anode is prevented from becoming more positive by the clamping diodes such as 161, 163, etc., and battery 165, 166, etc., which battery voltage is slightly less positive than the anode supply voltage and at the normal voltage of the anode when the left-hand section is nonconducting. As a result the voltage of the shift synchronizing pulses for such stages appears across the resistors 162, 164, etc.

Consequently, each of the synchronizing pulses causes the circuits in each stage to be returned to their normal or zero condition.

Each of these synchronizing pulses is also applied to amplifier 103 which permits a one read by the pick-up device 102 to be amplified by the amplifier 103 and transmitted through the inverter tube 104 to the delay device 106. The transmission of each of the synchronizing pulses through the delay device 106 is delayed so that the pulse as applied to the diodes 109, 110, 203, 204, 205, etc. has terminated before the corresponding pulse from amplifier 103 is transmitted through this delay device 106 and applied through the diode 140 to the anode of the right-hand section of the grid of the left-hand section of tube 111 of the first stage of the shift registers. As a result, this pulse which is assumed to represent a one and to be of a positive polarity causes conduction to be initiated through the left-hand section of tube 111 and conduction to be interrupted through the right-hand section of this tube. Consequently, the voltage of the anode of the right-hand section changes to a high positive value and the voltage of the anode of the left-hand section changes to a low positive value.

Assume, also, that the character of the digit or binary bit recorded in the next cell in track 123 is a one. When this pulse is read by the pick-up device 102 it will produce a positive output from amplifier 103 under control of the next read synchronizing pulse. This next read synchronizing pulse is also applied to the resetting conductor of the shift register which causes the conduction within tube 111 to be reversed, that is, conduction through the right-hand section is initiated and interrupted to the left-hand section. As a result, a positive pulse is applied to the delay network 107. Likewise, the positive pulse is applied through the inverter 104 to the delay device 106 at substantially the same time. After the termination of the read synchronizing pulse applied to the input of the delay devices 106 and 107, pulses appear at the outputs of these delay devices. These delayed pulses are applied to the control elements of the left-hand sections of the shift register tubes 111 and 112. Again, assuming that the second pulse so read is a one, then pulses are applied to the control elements of the left-hand section of tubes 111 and 112 to cause the initiation of the flow of current through the left-hand section of these tubes.

Assume now that the third pulse read will be a zero. This pulse is read at substantially the same time as the third synchronizing pulse is obtained from source 105 with the result that the circuits of tubes 111 and 112 are restored to normal and positive pulses are applied to the delay devices 107 and 108. However, since the third pulse read from track 123 is a zero, a positive pulse is not applied to the delay device 106. No positive pulse will be applied to the control element of the left-hand section of tube 111. Consequently, the circuits of this tube remain in their normal or inactive condition, while the conduction within the tubes 112 and 213 is reversed with current now flowing through the left-hand sections of these tubes instead of through the right-hand sections.

If, we now assume that the fourth pulse read by the pick-up device 102 is a one, then a positive pulse is obtained from the inverter during the time the positive synchronizing pulse is applied to the amplifier. Likewise, the fourth positive synchronizing pulse causes the conduction within the section of tubes 112 and 213 to be reversed or restored to their initial or zero condition with a result that a positive pulse is applied to delay devices 108 and 201 at substantially the same time as a positive pulse is applied to the delay device 106. At the end of the fourth positive read synchronizing pulse, positive pulses will therefore be applied to the left-hand control sections of tubes 111, 213 and 214. Consequently, the discharges within these tubes are reversed so that the condition of tube 214 represents a one, the condition of tube 213 represents a one, and the condition of tube 112 represents a zero since no pulse was applied to its control element in the condition described above. Likewise, the condition of tube 111 represents a one. Thus the four stages of the shift register starting with stage 214 represent 1101. In a similar manner each of the succeeding digits obtained from the track 123 is entered in the shift register and progressively advanced through each of the stages of this register one step at a time. Each time a pulse is added to stage 111 the ninth preceding pulse is stepped out of and discarded from the eighth stage 218. Thus, the setting of the eight stages of the shift register represent an 8-digit binary number which number uniquely identifies each of the 256 possible slots around the drum since there are 256 separate distinct 8-digit binary numbers.

These 8-digit binary numbers in accordance with the exemplary embodiment shown in Figs. 1 and 2 are applied to a diode matrix shown in the center and lower portions of Figs. 1 and 2. It is assumed that the output from the shift register tubes is suitable for driving the various gate and other circuits. When desirable additional output amplifiers or cathode followers may be employed to obtain the necessary or desirable output voltage, power, or energy to properly control the various gate circuits. Such amplifiers or cathode followers may also be employed in any of the gate circuit input or output conductors when necessary or desirable. Such amplifiers or cathode followers operate in their usual manner in combination with the other elements of the exemplary embodiment described herein.

This diode matrix comprises a plurality of so-called "and" and "or" circuits and is employed to successively and individually interconnect or transmit a voltage condition from each of a plurality of devices 124, 125, 126, 127, 128, 129, and 130 to an output terminal 216.

The input devices 124 through 130, inclusive, represent eight of a possible 256 such devices. These devices may comprise relay contacts as represented by device 124 or they may represent electronic gate devices or they may comprise any other suitable two-state devices which have an output of two different voltages.

The diode matrix is arranged so that normally when a positive potential is applied by the input devices, such as 124 through 130, the input positive voltage causes sufficient current to flow through the series resistors such as 134 so that substantially the entire input voltage appears across the resistor. Consequently, normally no output pulse is obtained at this time in response to this positive voltage.

Resistor 134 is connected to the diode 151 which diode in turn is connected to the diodes 117, 120 and 122. Diode 117 is connected to the left-hand anode of tube 111, the diode 120 is connected to the right-hand anode of tube 112 and the diode 122 is connected to the right-hand anode of tube 213. When the voltages of these anodes are relatively low current will flow through the diodes 151, 117, 120 or 122 and maintain the voltage of conductor 152 low near ground voltage, so that substantially no pulse or current is transmitted through the diode 153.

However, when the voltage of the anodes of the above-enumerated sections of tubes 111, 112 and 213 become high and if the relay 124 has its armature connected to a high positive voltage, then a positive voltage is transmitted through the diode 153. In a similar manner, this voltage may be transmitted through the diodes 254 and 255 to the output 260 when the remaining stages of the binary counter are set in an appropriate and similar manner. If, however, the relay 124 has ground applied to its armature at this time no such output positive pulse is obtained at the output of conductor 260. Thus when a positive pulse may be obtained at the output conductor 260, it is necessary first that the input device 124 have a high positive output and also that the binary counter stages from right to left represent the following binary digits or number: 10110110. In order to prevent spurious output pulses when the output from the shift registers changes an additional output gate 270 is provided in the output conductor 260. This gate is supplied with read synchronizing pulses so an output can be obtained only during a positive output on conductor 260 and a pulse from source 105. Delay device 272 is provided to properly time the synchronizing pulse applied to the gate 270 so the stages of the shift register do not change during the output pulse on conductor 260.

Positive pulses are similarly obtained under control of the input devices as shown in the accompanying Table A:

*Table A*

| | |
|---|---|
| **124** | 10110110 |
| **125** | 10110010 |
| **126** | 10110001 |
| **127** | 10010110 |
| **128** | 10010001 |
| **129** | 01001110 |
| **130** | 01001001 |

If a spurious pulse is applied to the shift registers output of the various stages will be incorrect. However it is necessary to apply only *n* proper pulses to the shift register to bring the circuits back into synchronism. Thus except under trouble conditions the output of the shift register and the output from the diode scanner at all times uniquely identifies the various storage items and even under trouble conditions the circuits automatically return to synchronism a minimum interval of time after the spurious trouble pulse.

The input devices 124 through 130 may or may not be controlled by information obtained from the corresponding slots identified by the position of the shift register in the manner described above. Likewise, the output conductor 260 will usually be employed to control the recording of information in one or more tracks in the slot identified by the setting of the shift register in the manner described above. For example, the diode matrix circuit and the control circuits therefor may be employed to replace the electrostatic scanner shown in United States Patent 2,700,148 granted to McGuigan et al. on January 18, 1955. In this case the devices 124 correspond to the segments 32 and are controlled by the line conditions and the output conductor 260 corresponds to the output conductor 22 or the output of amplifier 20 of said patent disclosure.

In the above description of the operation of the arrangement shown in Figs. 1 and 2, it was assumed that a series of numbers having the above-described properties were obtained and the last digit of these numbers recorded in track 123 around the drum 100. In addition, a simple series of two digit numbers having the above-identified properties is shown above.

It is, of course, possible to devise or arrange many such series of numbers in having any desired number of digits or denominational orders. The number of digits or denominational orders determines the total number of such numbers and thus the total number of information items which may be uniquely identified by said numbers. Thus, in the binary system where $n$ represents the number of digits or denominational orders of the number the total number of such numbers is $2^n$.

In the above description of Figs. 1 and 2 it was assumed that $n$ was 8 so that there were 256 such numbers. Inasmuch as the rules for devising or arranging numbers in series having the above-described properties applies to numbers of any number of digits or denominational orders, these rules will be illustrated for $n$ equaling a small integer, it being understood that the same rules apply for other integral values of $n$. For purpose of illustration a method of obtaining a suitable series of numbers wherein $n$ is 4 will now be described with reference to Table B which is as follows:

*Table B*

| 1 | 2 | 3 | 4 | 5 |
|---|---|---|---|---|
| 0000 | 0 | 1 | 1 | 0001 |
| 0001 | 1 | 3 | 3 | 0011 |
| 0010 | 2 | 5 | 7 | 0111 |
| 0011 | 3 | 7 | 15 | 1111 |
| 0100 | 4 | 9 | 14 | 1110 |
| 0101 | 5 | 11 | 13 | 1101 |
| 0110 | 6 | 13 | 11 | 1011 |
| 0111 | 7 | 15 | 6 | 0110 |
| 1000 | 8 | 1 | 12 | 1100 |
| 1001 | 9 | 3 | 9 | 1001 |
| 1010 | 10 | 5 | 2 | 0010 |
| 1011 | 11 | 7 | 5 | 0101 |
| 1100 | 12 | 9 | 10 | 1010 |
| 1101 | 13 | 11 | 4 | 0100 |
| 1110 | 14 | 13 | 8 | 1000 |
| 1111 | 15 | 15 | 0 | 0000 |

With $n$ equal to 4 it is possible to have 16 different numbers. These numbers are arranged in the numeral binary number arrangement in column 1 of Table B. In column 2 of Table B these numbers are given the corresponding decimal notations or numbers 0 to 15. In column 3 the odd integers of the numbers 0 to 15 are listed twice, one opposite each one of the numbers in columns 1 and 2.

In devising a sequence of numbers having the above-described properties, one starts in the first row of column 2 and then observes the corresponding number in column 3 which is a one. Next a one is written in column 4 and the corresponding binary notation for one written in column 5. Next the line of the table having a one written in column 2 is observed and the corresponding number in this line in column 3 entered as the second number in column 4, this number being a 3. The corresponding binary number or notation for 3 is then entered in column 5. Next the line in Table B having a 3 in column 2 is observed and the corresponding number in column 3 being a 7, a 7 is entered in column 4, line 3, the corresponding binary number entered in column 5, line 3. Next the line of the table having a 7 in column 2 is observed and the corresponding number for this line in column 3 which is 15 is entered in the fourth line of column 4 and the corresponding binary number entered in the column 5. Next the line of the Table B having 15 in column 2 is observed. The corresponding number in column 3 is also 15. However, 15 has already been entered in column 4, line 4 so one is subtracted from 15 and 14 entered in column 4. The corresponding binary number is entered in column 5. Then the line of the table having 14 entered in column 2 is observed and the corresponding number in this line of column 3 is 13. Inasmuch as 13 has not been previously entered in column 4, 13 is now entered in column 4 and the corresponding binary number entered in column 5. The above steps are then repeated until the columns 4 and 5 are completely filled in. Each time a number determined in column 3 has not been previously entered in column 4 this number is entered in column 4 and the corresponding binary number entered in column 5. Each time the number as determined from column 3 has been previously entered in column 4, one is subtracted from this number and the resultant number entered in column 4 and the corresponding binary number entered in column 5. Columns 4 and 5 have been completed in the above fashion. It should be noted that each of the binary numbers of column 1 appears once and only once in column 5, but that the numbers are arranged in a different order than the order shown in column 1. If it is assumed that these numbers are arranged on an endless tape then each one of the numbers has the same digits as the last digits of the preceding three numbers and the last digit of the number in question. Thus, the first number 0001 may be obtained by observing the last digits of the last three numbers in the table and the last digit of the first number which is 0001. In a similar manner, each of the other numbers in column 5 may be determined from the last column of digits. Consequently, it is necessary to add only the last digits of these numbers to 16 different storage items and then observe the last digits of the proper four storage items to uniquely identify a corresponding storage item. As shown in column 5, the last of the four digits reading down is the same as the corresponding number from which the last digit is obtained. It should be observed, of course, that these numbers may be employed to identify a storage item arranged in the same line, in a plurality of similar other lines or in the same slot on a magnetic drum. Sometimes in describing the operation of a magnetic drum, the surface of the magnetic drum is divided into "tracks" or "channels" around the drum and into "slots" along the drum. The elemental storage areas are called cells. Each cell forms a part of one track or channel and a part of one slot on the surface of the drum.

The four digits may be employed to designate some other storage item, as for example, the storage item in the next line or slot or the storage item in a preceding line or slot or some other storage item displaced a desired number of lines or slots from the last digit observed or related in some other predetermined fashion with the digits observed.

Of course, the series of numbers shown in column 5 is assumed to be the same series independently of where one starts, i.e., independently of which one of the numbers of column 5 appears one at beginning and the end of the column and independently of which one of the numbers is assigned to identify the first storage item or word to be uniquely identified. It is also possible to arrange numbers in a reverse order so that the last digits should be read up instead of read down. It is also possible to invert the numbers from left to right so that the digits in the first column will be the same as the succeeding digits of the various numbers. In addition, the digits of the numbers may be rearranged so that some one of the digits in an intermediate column may define the other digits of the number as may be desired. Of course, in any of the various series of numbers that one might obtain, a different series may be readily obtained by interchanging the ones and the zeros. In addition to the above variations in different arrangements of the numbers, it is possible to obtain different series of numbers having the above-described properties and the larger the number of digits $n$ the greater the number of different series of such numbers may be devised. In addition, each of the different series has all the various alternatives mentioned above.

Having obtained such a series of numbers by following the above-described rule or in any other manner, the last digits of these numbers are entered in the track 123 around the drum in any desired manner. Then the circuits shown in Figs. 1 and 2 operate in the above-described manner and uniquely identify each one of the slots or storage spaces on the surface of the drum. Thus, these numbers identify all of the storage spaces in each of the tracks around the drum in each position of the drum relative to the pick-up devices or heads.

After one has obtained such a series of numbers as shown in column 5, and examined the last or any other predetermined digit having the desired properties, it is possible to devise logic rules for determining the various digits in this column. Certain of these rules may be implemented to provide automatic means or devices for generating such a series of digits. One such rule may be stated as follows: starting with the first number and last digit thereof assuming this is a one, a one is written as the first choice for the successive last digits until this can no longer be done without repeating a previously written combination of $n$ successive digits. Thus a one is written as the last digit, first line, column 5, table B, a one is written as the last digit in the second line of this column, a one is written as the last digit in the third line of this column and also in the fourth line. However, if a one was written in the line 5 as the last digit, then the preceding three digits and the last one written would be all ones and thus would be the same as the four ones written as the last digit in the first four lines of this column. Consequently, as a second choice a zero is written as the last digit in the fifth line in column 5. In the sixth line a one is written as the last digit because the corresponding previous three digits together with one form a combination of four digits not previously entered as the last digit, column 5. In this manner, writing ones as first choice when the resulting combination has not been previously written and a zero when the combination has been previously written, the last digits of the series of numbers shown in column 5 of table B may be readily obtained and from these digits numbers determined. It is to be noted that if the numbers are determined, the last digits are also determined or if the last digits of the series of numbers are determined the numbers are also determined.

Where the various arrangements of the last digit can be readily found by following a simple logical process as in the last arrangement described above, it is possible to build a circuit and apparatus to determine such a sequence of numbers or digits automatically. The circuit can also be arranged to write the values of the various digits on the track of the magnetic drum or to otherwise append them to the storage items or spaces as the series is constructed. In this manner the problem of both devising such a system and the recording of it on the drum is readily solved. Of course, circuits may be devised for automatically obtaining such a series of numbers and then automatically storing the corresponding digits in proper word spaces or information item spaces in a delay line, or on a magnetic or perforated or embossed tape or the digits may be automatically applied to a series of cards or other storage means or devices.

Fig. 3A shows in block diagram form the elements of an exemplary embodiment of this invention for automatically generating a sequence of binary digits, or binary bits. These binary digits or bits, after being generated, are recorded in sequence in the identifying track 123 by means of the combined recording and pick-up device 102. This pick-up device is interconnected with the reading amplifier 103 and the writing amplifier 301. The output of the reading amplifier is transmitted to an $n$ stage shift register 107. The source of reading synchronizing pulses 105 is connected to the amplifier 103 and the shift register 107 as described above. The output of this shift register 107, in addition to being connected to the diode switching matrix 108 as shown in Fig. 1A, is also interconnected with the matching circuit 321. A start circuit 324 is provided and interconnected with the write control circuit 323. This write control circuit is in turn interconnected with the shift register 107 and matching circuit 321 and with a second shift register having $n$–1 stages.

The circuit for automatically generating and recording or storing the identifying digits operates in accordance with the logic rules and described herein. These circuits, such as shown in Figs. 1A and 3A, operate substantially independently of the number of stages $n$ or $n$–1 provided in the various shift registers. The details of these circuits are shown in Figs. 3 and 4 and the detailed operation is described with reference to these figures. Briefly, it is assumed that all zeros will be initially recorded in the track or channel 123 in any suitable manner, as for example by causing proper current to flow through the windings and the pick-up head 102. This proper current may be caused to flow through the proper winding of this device by means of manual keys, switches or other suitable devices.

The start circuit 324 is then set into operation and the zeros will be read into the $n$ stage shift register 107. Each of the stages of this shift register 107 as well as each of the stages of the shift register 322 are initially set in their zero states. Thus a match will be obtained from the matching circuit 321 which causes the write control circuit 323 to write a "one" in the succeeding slot in track 123 on the drum and enter a "one" in the left-hand stage of the shift register 322. Thereafter the drum continues and completes a revolution, during which all zeros are read into the shift register 107. The result is that no match is obtained between the last stages in this register and the stages of the shift register 322. However, after one revolution of the drum the "one" previously recorded in the track 123 will again be read into the shift register 107, and when the digit stored in the next storage space, i.e. a "zero," is read into this shift register from the pick-up device 102, a match will be again obtained and the output from the matching circuit 321 which again causes a one to be recorded in the second slot. In addition, a one will be entered in the left-hand stage of the shift register 322. Thus two successive slots in the identifying track 123 of the drum will have ones recorded in them. In addition, the two left-hand stages of the shift register 322 have ones recorded in them, and remaining stages of this shift register have zeros recorded in them. During the remainder of this revolution thereafter, zeros are read from the track 123 and step through the shift register 107 in the usual fashion.

The above-described operation is then repeated for each revolution in the drum until $n$ ones are recorded in successive slots in the track 123. On the next revolution of the drum the $n$ ones are read into the shift register 107. If a one were entered into the next slot of the identifying channel two sequences of $n$ digits will be the same, in which event the matching circuit 321, together with the shift registers 107 and 322, cause the write control circuit 323 to leave a zero recorded in this next slot and advance the shift register 322 to cause a zero to be recorded in the left-hand stage of this shift register. Thereafter the above cycle of operation is repeated until a sequence of identifying digits described herein is recorded in the channel 123, one digit of the sequence being recorded in each of the slots to be uniquely identified.

Figs. 3 and 4 with Fig. 3 placed to the left of Fig. 4 shows in detail a circuit arrangement for automatically generating a suitable order of binary digits, each of which is associated with and automatically entered in a slot in an identifying track on a magnetic drum storage device. Simultaneously, with the generation of such series of binary digits they are recorded in the identifying track and in the proper slot thereof on the magnetic drum. The drum 100 represented in Fig. 3 is assumed to be the same drum 100 shown in Fig. 1. Drum 100 shown in Fig. 3 is usually operated by motor 101 and the identifying track is represented at 123. The combined pickup and recording device 102 is shown adjacent the identifying track 123 and is connected both to a writing amplifier 301 and a reading amplifier 103. Inasmuch as these amplifiers are gated to be operative at different times the connection of both amplifiers to the pick-up device 102 operates satisfactorily since neither amplifier can interfere with the operation of the other amplifier. As shown in Fig. 3, both of these amplifiers are connected to a single winding of a pick-up device 102 for simplicity. It is to be understood however that these amplifiers may be connected to separate and distinct reading and writing windings when desired, or they may be connected to a single winding as shown in Fig. 3. The reading amplifier is controlled by a source of read synchronizing pulses 105 similar to the source 105 shown in Fig. 1, while the writing amplifier is controlled by a source of writing synchronizing pulses 305. The read synchronizing pulses are timed to occur when the leading part of a cell or elemental storage area of the surface of the drum passes under the pick-up device while writing synchronizing pulses are timed to occur when substantially the center of the cell passes under the pickup device. The sources 105 and 305 are usually derived from timing signals recorded on a drum or in some other way derived from the drum by means of tooth wheels or other devices rotated on the same shaft with the drum or rotated synchronously therewith at the same speed or some multiple or submultiple thereof. Exemplary arrangements for obtaining suitable sources of synchronizing pulses such as represented by sources 105 and 305 are described in detail in United States patent applications of Cornell-McGuigan-Murphy Serial No. 307,108 filed August 29, 1952 and Henning-Murphy-Teager Serial No. 310,264 filed September 18, 1952.

The output of the reading amplifier 103 is transmitted through the inverter 104 and a delay device 106 to the first stage 111 of a shift register, while the read synchronizing pulses 105 are transmitted to the right-hand grid of each of the stages of the shift register.

Four stages of the shift register are shown in Fig. 4 comprising tubes 111, 112, 213 and 218. These stages represent the same shift register as shown in Figs. 1 and 2. It is noted that Figs. 1 and 2 show five stages, while Fig. 4 shows four stages. It is to be understood that the same number of stages are provided in the reading shift register shown in Figs. 1 and 2 and in Fig. 4. It is also to be understood that any suitable number of stages for the shift register may be provided both in Figs. 1 and 2 and in Fig. 4 as may be necessary to uniquely identify each of the slots on the magnetic drum. It is previously assumed that the shift register shown in Figs. 1 and 2 comprise eight stages of which five were shown. Under the same assumption, Fig. 4 shows four of the stages with four stages not being shown in the figure, the omitted stages being substantially the same as the intermediate stages shown in both Figs. 1 and 2 and in Fig. 4.

The operation of the circuits are substantially independent of the number of stages of the shift registers shown and in order to simplify the description and aid in the understanding of the exemplary arrangement shown in Fig. 4 a four-digit number is assumed to be all that is required so that it will be assumed that only four stages of the shift register will be provided. Of course, the intermediate stages indicated in the drawing will be provided when it is desired to uniquely identify a greater number of slots around the surface of the magnetic drum. The output of the shift register comprising the tubes 111 through 218 in addition to being connected to the circuits shown in Figs. 1 and 2 is also connected to the matching and gating circuits shown in Fig. 4. The two different groups of circuits are shown in two different series of figures instead of all in one series of figures, in order to simplify the drawing and aid in the understanding of the operation of the circuits under the two conditions. As shown in Fig. 4 a second shift register having one less stage is also provided which comprises tubes 406, 407 and 408. Each of the stages, except the first stage 111, of the first shift register is interconnected stage by stage with a stage of the second shift register through a matching circuit or circuits such as circuits 409, 410 and 411. The matching circuits 409, 410 and 411 are so arranged that they will each have a positive output when the corresponding stages of the two shift registers are set in the same condition. Thus, when tube 112 is set to represent a zero and tube 406 likewise set to represent a zero, both of their left-hand anodes will be at a high positive potential with the result that a high positive potential will be obtained through the left-hand section of the matching circuit 409. Likewise, when the tubes 112 and 406 are set to represent ones, their right-hand anodes will have a high positive potential with the result that a positive potential will be obtained from the right-hand section of the matching network 409. In a similar manner positive potential or positive pulses are obtained from the other matching networks when the corresponding tubes or stages of the two shift registers are similarly conditioned or set. At all other times no such positive potential is obtained from the matching circuits.

Turning now to the operation of Figs. 3 and 4 in accordance with an exemplary embodiment of this invention the track on the drum in which the identifying digits or bits are to be entered is first magnetically polarized or conditioned to represent all zeros recorded therein by applying direct current to the pick-up device 102 for one or more revolutions of the drum. Zeros may be initially entered in this track in any other manner when desired. Next power is applied to the system and then switches 315 and 316 and the corresponding switches in each of the stages of the shift registers close so that conduction starts through the right-hand sections of the various tubes. These switches may be individually manually operated or they may be manually operated by a single switch or they may be controlled by one or more relays or other automatic circuit closer. Then a positive start pulse is first applied over conductor 302. This pulse may be obtained from a manual key or it may be obtained from some reference pulse at any desired time, from a timing or indexing track or channel on the drum 100 or from any other suitable source and transmitted through a start key, gate or switch. The positive start pulse applied to conductor 302 will be transmitted to the upper diode of the "or" circuit 306 and the decoupling diode 311 to the left-hand grid of the start tube 303. This tube is arranged in a bistable multivibrator or flip-flop circuit with the right-hand section normally conducting.

With the right-hand section normally conducting, application of a positive pulse to the left-hand section causes the left-hand section to become conducting and the right-hand section nonconducting with the result that positive potential is applied to the upper diode of the "and" circuit 308. It is also assumed that initially the magnetic state of each of the cells of the identifying track 123 are set in a magnetic condition representing zeros. As a result each of the stages of the shift register comprising tubes 111 to 118 are set in their zero condition with their right-hand sections conducting. Similarly, the right-hand sections of tubes 406, 407 and 408 are conducting which also represent zeros in the writing shift register. As a result, a high positive potential is obtained from each one of the match circuits and applied to the "and" circuit 404. Consequently, a high positive potential is obtained from the output of the "and" circuit 404 and applied to the lower diode of the "and" circuit 308. Then when the next write synchronizing pulse obtained from source 305 after a start tube 303 is actuated as described above, it will cause a high positive voltage to be applied to the center diode of the "and" circuit 307. Since the first stage of the shift register comprising tube 111 is set to represent zeros at this time, a high positive voltage is likewise applied to the lower diode of the "and" circuit 307. Likewise, the double stability circuit comprising tube 304 is set with the left-hand section nonconducting this time so that a high positive voltage or pulse is applied to the upper diode of the "and" circuit 307. Consequently, the high positive pulse is obtained from the output of the gate circuit 307 at this time. This output pulse is applied to the writing amplifier 301 with the result that a one is written in the corresponding track and slot on the magnetic drum. In addition, a positive pulse is applied to the lower diode of the "or" circuit 405 to the grids of the right-hand sections of tubes 406, 407 and 408 tending to restore conduction to the right-hand section of these tubes, if these sections have been nonconducting. Under the assumed condition each of these sections was previously conducting so that these sections merely remain conducting at this time.

The pulse transmitted through the lower diode of an "or" circuit 405 is also applied through diode 312 to the grid of the right-hand section of the start tube 303 thus causing the initiation of the flow of current through this section which restores the tube to its initial condition and removes the high positive voltage applied to the upper diode of the "and" circuit 308. Consequently, succeeding write synchronizing pulses will not cause ones to be written in the identifying track 123, nor will the writing shift register be advanced or any of the other pulses recorded in it.

The pulse obtained from the "and" circuit 307 at this time in addition to actuating the writing amplifier 301 and causing a one to be recorded on the drum and also being applied to the shift leads of the shift register comprising stages 406, 407 and 408 as described above is also applied through the delay network 412 in the decoupling diode 418 to the grid of the left-hand section of tube 406. As a result, after the reset pulse has terminated a pulse from the delay network 412 is applied to the left-hand grid of tube 406 causing a flow of current through the left-hand section of this tube and in turn interrupting the flow of current through the right-hand section. All of the above-described operations take place before the next read synchronizing pulse is obtained from the read synchronizing source 105.

The next succeeding read synchronizing pulse is applied to the reading shift register comprising tubes 111, 112, 213 and 218 in the manner described hereinbefore. However, since only zeros are continued to be read by the reading amplifier, each of these stages continues to remain in its normal condition and only record zeros. It is noted that the cell in which the one was written in the manner described above was not read by the pick-up 102 and did not actuate reading amplifier 103 so that the one is not entered into the reading shift register during the first revolution of the drum. Nothing further happens in the circuits for the remainder of the first revolution of the drum after the one was recorded in the identifying track 123.

During the second revolution of the drum, the one recorded during the first revolution is read by the pick-up device 102 and actuates reading amplifier 103 and after the delay interval of the delay device 106 will be entered in the first stage of the reading shift register 111. At this time, a one has been recorded in the first stage of the writing shift register comprising tubes 406, 407 and 408 with the result that the anode of the right-hand section of tube 406 is at high positive potential, which potential is transmitted to the upper diode of the "or" gate 403 and applied to the lower diode of the "and" circuit 401. Also at this time the first stage of the reading shift register has a one recorded in it and all of the remaining stages zeros. Consequently, a high positive potential is applied to each of the input conductors of the "and" circuit 402 with the result that a high positive potential is applied to the upper diode of the "and" circuit 401. As a result, a high positive voltage is applied from the output of this "and" circuit both to the right-hand grid of tube 304 through diode 314 and the left-hand grid of tube 303 through the lower diode of the "or" circuit 306. Since the right-hand section of tube 304 is already conducting the application of a positive pulse to its grid merely continues the circuit in its previous state. However, the application of a positive pulse to the left-hand grid of tube 303 again actuates the start multivibrator or flip-flop 303 and in return applies positive voltage of the upper diode of the "and" circuit 308. It should be noted that at this time a zero is recorded in the second stage 112 of the reading shift register and a one in the first stage of the writing shift register 406 with the result that no high positive potential is obtained from the matching circuit 409 so that no high positive potential is applied to the lower diode of gate 308. Consequently, a write synchronizing pulse is still not transmitted through the gate circuit 308.

When the one previously recorded has passed the pick-up head 102 and the zero recorded in the next cell starts to pass under the pick-up device or head 102 it will be read by the reading amplifier 103 and the one previously recorded in the first stage of the reading shift register 111 will be advanced to the second stage, thus causing tube 112 to record a one. In the meantime, a zero is recorded in the first stage 111 of the reading shift register. When a one is recorded in the second stage 112 of the reading shift register a high positive potential will be obtained from the match circuit 409 because the one is also recorded in the first stage of the writing shift register 406. Since zeros are recorded in all of the other stages of both the reading and writing shift registers positive pulse will be obtained from the output of the "and" circuit 404 and applied to the lower diode of the gate circuit 308. Consequently, the write synchronizing pulse will be transmitted through this gate circuit and through the "and" circuit 307 in the manner described above when the center of the cell following the cell having a one entered in it passes under the center of the pick-up device 102 so a one will be written in the second cell of the identifying track 123. In addition, the start flip-flop circuit 303 will be reset to normal and a shift pulse applied to the reading shift registers. At a short time later a positive pulse will be transmitted through the network 412 and cause a one to be recorded in the first stage 406 of the reading shift register. At this time, a one is recorded in both the first stage 406 and the second stage 407 of this shift register. When the zero in the succeeding cell of track 123 is read the one recorded in the second stage of the reading shift register will be advanced to the third stage and an additional zero is recorded in the first stage. As each cell of track 123 thereafter is read during the second revolution of the drum the ones recorded in the shift register are advanced successively through each stage of the shift register and finally out of the shift register in the manner described above. Thereafter, the circuits remain in the condition described for the remainder of the second revolution.

The beginning of the third revolution of the one first recorded in the drum again causes the start circuit 303 to be actuated in the manner described above and thereafter the circuits respond in substantially the same manner and cause a one to be entered in the third cell of the identifying track. At this time, it is noted that a match will not be obtained and thus an output pulse will not be obtained from the gate circuit 404 until the third cell of the identifying track 123 is under the recording head.

The above-described operation then continues until a one is written in the *n* consecutive cells of the identifying track during the first *n* revolutions of the drum where *n* is the number of stages of the reading shift register. If it is assumed that there are four stages then during the first four revolutions after the first start pulse is obtained over conductor 302 a one will be written in four successive cells in the identifying track 123 on the drum.

At the beginning of the fifth revolution of the drum the start circuit 303 is actuated as described above. Thereafter, the ones previously written in the drum are recorded in the reading shift register. At this time a one is also recorded in each of the stages of the writing shift register. Consequently, a match is not obtained between the described stages of the writing shift register and the read shift register until the first one entered into the reading shift register during the fifth revolution has been advanced and entered in the final stage 218 of the reading shift register. At this time, however, a one is recorded in all of the stages of the read shift register. Inasmuch as a one is now recorded in the first stage of the shift register the anode of the left-hand section of this tube is at a relatively low positive voltage so that the write synchronizing pulse from source 305 cannot be transmitted through the "and" gate circuit 307. Instead, the right-hand anode of tube 111 is at a relatively high positive voltage so that a high positive voltage is applied to the upper diode of the "and" gate circuit 310. Consequently, a high positive voltage is transmitted through the lower diode of the gate circuit 310 in response to the write synchronizing pulse 305 obtained at this time. As a result, a positive voltage is applied to the left-hand grid of tube 304 instead of to the writing amplifier 301. As a result, the magnetic condition of the fourth cell under the reading and writing device 104 at this time remains unchanged, i.e., represents a one.

When the next cell, i.e., the fifth cell, is read a zero is read into the reading shift register. However, all of the stages except the first stage comprising tube 111 still have ones entered into them so that a match is again obtained between these stages of the reading shift register and the stages of the writing shift register which also has all ones entered into each of its stages. Consequently, a match is again obtained and a high positive voltage obtained from the "and" circuit 404. This positive voltage is again transmitted through the "and" gate circuit 308 when the next writing synchronizing pulse is received from the synchronizing generator or source 305. The high positive pulse from the synchronizing source 305 through the gate circuit 308 is not transmitted through the "and" gate 307 at this time because tube 304 is actuated with the result that the anode of the left-hand section of this tube is at a relatively low voltage so that the upper diode of the "and" circuit 307 prevents the output of this gate from rising to a high positive voltage. Consequently, the writing amplifier 301 is not actuated and does not write a one in the track 123 at this time. Similarly, the first stage of the reading shift register 111 is now set and has a zero entered in it with the result that its right-hand anode is at a relatively low voltage so that the upper diode of the "and" gate 310 prevents a positive voltage from being transmitted from this gate.

Instead, the high positive voltage from the gate 308 and the source 305 at this time is now transmitted through the gate 309. Inasmuch as tube 304 is actuated its right-hand anode will be a relatively high voltage and apply a high positive voltage to the upper diode of the "and" gate 309. Likewise, the left-hand anode of tube 111 is at a high positive voltage when a zero is entered in this stage of the shift register so that a high positive voltage is also applied to the middle diode of gate 309. Consequently, the high positive voltage from the synchronizing source 305 is transmitted to the gate circuits 308, 309, then through the upper diode of "or" circuit 405 and diode 312 to the right-hand grid of tube 303 thus restoring this start circuit to its initial condition. In condition, the positive voltage transmitted through the upper diode of the "or" circuit 405 is applied to the shift conductor of the writing shift register and causes the digits entered into this register to be shifted one stage to the right. Inasmuch as a one was not written by the writing amplifier 301 in track 123, a one is not entered into the first stage of the writing shift register so that reading from left to right, these stages now have a zero, a one and a one entered into them. The ones entered in the reading shift register are then advanced through this register.

The circuits thereafter remain in the indicated conditions with four ones written in the indicating or identifying track 123. The drum 100 then continues to rotate until the first one recorded in track 123 is read by the head 102 and entered in the first stage of the reading shift register 111. At this time zeros will be entered in all of the other stages of the reading shift register so that a positive pulse is obtained from circuit 402. In addition, a positive pulse is obtained from the gate circuit 403 because ones are entered into the second and third stages of the writing shift register. Consequently, a positive pulse is also obtained from the "and" gate circuit 401 and applied through the diode 314 to the right-hand grid of tube 304 thus restoring the circuits of this tube to their initial or original condition. The positive pulse obtained from gate circuit 401 is also applied through the lower diode of gate circuit 306 and diode 311 to the left-hand grid of tube 303 thus actuating the start circuit of this tube and causing a high positive voltage to be applied to the upper diode of the gate circuit 308. The drum continues to rotate and the four ones recorded in the track 123 are read into the shift register comprising tubes 111, 112, 213 and 218. At this time, a match is not obtained with the wiring shift register because a zero, a one and a one are entered into this shift register. When the next cell is read by head 102 which cell has a zero entered in it a match of the stages of the two shift registers is not obtained because a one is still entered in the last three stages of the read shift register. When the next zero is read by the head 102 and entered into the reading shift register the stages of the reading shift register reading from left to right will now have a zero, a zero, a one and a one entered in them. Consequently, a match will be obtained between the last three stages of the reading shift register and writing shift register and a pulse transmitted through the gate circuit 308 in a manner described above. This time as pointed out above a zero is entered in the first stage of the reading shift register so that the writing synchronizing pulse obtained from gate 308 will be transmitted through gate 307 and cause a one to be entered into the cell under head 102 at this time. In addition, a shift pulse is applied to the writing shift register and a one entered into stage 406 of this shaft register. In addition, the start circuit comprising tube 303 is again restored to its initial condition. At this time the following digits are entered in the track 123 namely, 111101. The writing shift register has entered in it a one, a zero and a one. The recorded digits entered in the reading shift register are advanced through this register.

Thereafter, the circuits remain in the above-described condition until the one first entered in the track 123 again passes under the pick-up head 102 at which time the start circuits of tube 303 are again actuated in a manner described above. Thereafter, the digits entered in track 123 are again read in succession and entered in the reading shift register in the manner described above. This time a match will not be obtained between any of the digits entered in the reading shift register until a zero following the last one entered in track 123 is read and entered into the first stage 111 of the reading shift register. At this time, the digits 101 are entered into the succeeding stages of the reading shift register and correspond with the digits 101 entered in the writing shift register as described above. Consequently, a match is obtained and a positive pulse transmitted through the gate circuit 404. The next writing synchronizing pulse 304 is transmitted through the gate 308 and inasmuch as a zero is entered into the first stage of the reading shift register at this time this writing pulse is also transmitted through the gate circuit 307 and causes a one to be written in track 123 and in addition causes a one to be entered in the writing shift register and the digits previously entered therein to be advanced one stage to the right with the result that reading from left to right the writing shift register has now entered therein a 110. In addition the writing of a one in track 123 causes the start circuit 303 to be restored to its original condition. At this time the following digits have been entered in track 123 namely, 1111011. The remaining recorded digits entered in the reading shift register are then advanced through the reading shift register.

The circuits thereafter remain in the above-described condition until the first one entered in the track 123 is again read by the pick-up device 102 and entered in the first stage 111 of the read shift register. At this time, the other stages of this register will have zeros recorded in them so that the circuits of tube 303 are actuated in the manner described above. Thereafter, the succeeding digits entered in the track 123 are read by the pick-up device 102 and entered in the read shift register in the manner described herein. When the third one entered in the track 123 is read by the pick-up device 102 and entered in the first stage 111 of the read shift register the various stages of the reading shift register will have the following digits entered in them reading from left to right, namely 1110. At this time, as pointed out above, the writing shift register has entered in it, reading from left to right, 110 so that a match is obtained between each of the stages of the writing shift register and the last three stages of the read shift register. At this time, a one is entered into the first stage of the read shift register so that the match pulse obtained through gate 404 at this time permits the next succeeding write synchronizing pulse from source 305 to be transmitted through gate 308 but not transmitted through gates 307 and consequently does not cause a one to be entered in the track 123 because a one has been entered in stage 111 so its left-hand anode is at a relatively low voltage which low voltage is applied to the lower diode of gate 307. Instead, the writing synchronizing pulse actuates the circuits of tube 304 which in turn prevents any further synchronizing pulses transmitted from source 305 through the gate 308 to be transmitted through gate 307 so long as the circuits of tube 304 are thus actuated.

The circuits then remain in the above-described condition while the succeeding digits stored in track 123 pass under the pick-up device 102. When the zero following the last one recorded in track 123 passes under the pick-up device 102 and is entered into the first stage of 111 of the read shift register the succeeding stages of the read shift register will again have entered into them the digits 110 which again match the digits in the writing shift register. Consequently, a match pulse is obtained from gate 404 which causes the succeeding write synchronizing pulse from source 305 through gate 308 to be transmitted through gates 309 and 405 instead of 307 or 310. The pulse in passing through gates 309 and 404 causes the start circuit 303 to be restored to its initial or unactuated condition and applies a shift pulse to the writing shift registers without a one to be entered in the first stage 406 of the write shift register. Consequently, the write shift registers now have entered into them 011.

Thereafter the circuits remain in the above-described condition except that the ones entered in the reading shift register are advanced through and out of this shift register until the one first entered in track 123 again passes under the recording device 102 at which time the circuits of tube 304 are restored to their normal or unactuated condition and the circuits of tube 303 actuated in the manner described above. Thereafter the digits previously entered in track 123 are read by the pick-up device 102 and entered into the reading shift register in succession. When the first of the second group of ones entered in track 123 pass under the pick-up device 102 and is entered in the first stage 111 of the read shift register the digits 011 will be entered into the other stages of the read shift register which correspond to the 011 entered in the write shift register. Consequently, a match is obtained at this time and a positive pulse transmitted through the gate 404 with the result that the next succeeding write synchronizing pulse is transmitted through gate 308. At this time a one is entered in the first stage of 111 of the read shift register so that a write synchronizing pulse transmitted through gate 308 is not transmitted through gate 307 but instead is transmitted through gate 310 where it causes the circuits of tube 304 to be again actuated without causing a one to be entered in the track 123. Thereafter, the succeeding digits in track 123 are read by the pick-up device 102 and entered into the reading shift register. When the second zero following the last one recorded in track 123 is read by the pick-up device 102 and entered in the reading shift register, the digits entered into the stages of this register are 0011 reading from left to right. Thus the last three stages have the same digits 011 entered into them as are entered into the stages of the writing shift register. As a result, another match pulse is obtained from gate 404 which permits the succeeding write synchronizing pulse to be transmitted through gates 303 and 309 at this time which restores the start circuit 303 and applies a shift pulse to the reading shift register without entering a one in this register. Consequently, this register now has 001 entered into it. The ones entered in the reading shift register are then advanced through this register.

The circuits then remain in the above-described condition until the one initially entered in track 123 is again read by the pick-up device 102 and entered into the first stage 111 of the read shift register. This time the circuits of tube 304 are restored to their initial or normal condition and the circuits of tube 303 actuated. Thereafter, the digits previously recorded in the track 123 are read and entered into the reading shift register and compared wih the digits in he writing shift register. This time a match will not be obtained between the last three stages of the read shift register and the stages of the writing shift register until the third zero after the last one recorded in track 123 is read by the pick-up device 102 and entered into the first stage 111 of the read shift register. At this time a match will be obtained and a positive pulse transmitted through the gate 404 and since a zero is now entered in the first stage 111 of the read shift register, a one will be entered into the track 123 with the result that the digits now entered in track 123 in their order of entering therein are 1111011001. In addition, a one is entered into the first stage of the right shift register so that the writing shift register has now entered therein 100.

The circuits of Figs. 3 and 4 continue to operate in the manner described above and cause ones or zeros to be recorded in the identifying track or channel 123 around the drum 100, one digit being determined and recorded during each revolution of the drum in the manner described above.

At the beginning of the fifteenth revolution, assuming the last digit of a four digit number is to determine and record, the writing shift register will have entered in it 001 reading from left to right. When the first one recorded in the track 123 passes under pick-up device 102 and is entered in the circuits of tube 111 comprising the first stage of the reading shift register, zeros are recorded in all of the other stages of this shift register at this time so that a positive output pulse is obtained from gate circuit 402. In addition, the one entered in the last stage of the writing shift register comprising tube 408 causes a high positive output to be obtained from the gate circuit 403. As a result, a high positive output voltage is obtained from gate circuit 401 which voltage restores the circuits of tube 304 to its initial condition, with the right-hand section conducting and in addition, applies a positive voltage to the grid of the left-hond section of tube 303, thus actuating the circuits of this tube. Thereafter the above-described digits entered in track 123 are successively read by the pick-up device 102 and entered in the reading shift register as described above. When the seventh one entered in the track 123 is read by the pick-up device 102 and entered in the first stage comprising tube 111 of the reading shift register, the other stages have entered in them 001, reading from left to right. Sonsequently, a match is obtained between the last three stages of the reading shift register and the writing shift register. As a result, a high positive output voltage is obtained from the gate circuit 404. At this time the circuits of tube 303 have also been actuated, as described above, so that the next succeeding writing synchronizing pulse from source 305 is transmitted through the gate circuit 308. At this time a one is recorded in the first stages of reading shift register so that the positive writing synchronizing pulse from gate 308 is not transmitted through gate 307 and does not actuate the writing amplifier 301 or the writing shift register or the circuits of tube 303. Instead, this pulse is transmitted through the gate circuit 310 and applied to the left-hand grid of tube 304, thus actuating the circuits of this tube so that the left-hand section becomes conducting and the right-hand section non-conducting.

Thereafter, the succeeding digits recorded in track 123 pass under the pick-up device 102 and are entered in the reading shift register. When the last one entered in track 123 is read by the pick-up device 102 and is advanced and recorded in the circuits of tube 218 of the reading shift register, the last three stages of the reading shift register will have entered in them 001. Consequently, a match is again obtained between these last three stages of the reading shift register and the corresponding stages of the writing shift register. Consequently, a high positive voltage is again obtained from gate 404 with a result that the next writing synchronizing pulse from source 305 is transmitted through the gate circuit 308. At this time this pulse is not transmitted through gate 307 because the left-hand section of tube 304 is conducting. This pulse is not transmitted through the gate circuit 310 because the first stage of the reading shift register comprising tube 111 has a zero entered in it so that the right-hand section of tube 111 is conducting. Instead, the positive pulse from gate 308 is now transmitted through the gate circuits 309 and 405 to the shift conductor of the writing shift register and causes the one recorded in the last stage to be advanced out of the register without entering a one in the first stage. As a result, a zero is entered in each of the stages of the reading shift register. The positive pulse from the gate 405 is also applied to the right-hand grid of tube 303 and thus restores the circuits of this tube to its initial condition with the right-hand side conducting. Thereafter, the remaining one and the last stage 218 of the reading shift register is advanced out of this register.

The determining of the last digits and the series of numbers and the entering of these numbers in track 123 has now been completed. The sixteenth number is all zeros. The circuits will operate in substantially the same manner where more than four stages are provided so that on the revolution of the drum $2^n-1$ the determining and recording of the digits around the identifying track have been completed. When the one first recorded in this track then passes under the pick-up device 102 on the next revolution, that is the sixteenth revolution where $n$ is 4 or the $2^n$ revolution, the circuits of tube 303 are not actuated. At this time a one will be entered in the first stage 111 of the reading shift register and zeros in all of the other stages so that a positive pulse or voltage will be obtained from the gate circuit 402. However, zeros are recorded in all of the stages of the reading shift register so that no pulse or high positive voltage is obtained from the gate circuit 403 and consequently no such pulse can be obtained from the gate circuit 401. Thereafter, the circuits for determining and recording the digits of the identifying number remain inactive with the right-hand section of tube 303 conducting and the left-hand section of tube 304 conducting.

Of course the circuits of the reading shift register continue to respond to the identifying digits recorded in the track 123 during each revolution of the drum and may be employed as described above with reference to Figs. 1 and 2 to uniquely identify each of the slots or storage items on the drum. Each of these storage slots or items, of course, may include a large plurality of digits or bit storage spaces which storage spaces are also arranged in tracks around the drum in the usual or any desired manner.

Each time it is desired to redetermine and rerecord such a series of identifying digits the above-described operations will be repeated, namely the surface of the drum in track 123 will be set to represent zero in all slots. Then power will be applied to the system and then to the left-hand anodes of tubes connected in double stability circuits and then the start key operated whereupon the above-described operation will be repeated and the series of digits recorded in the track 123 as described above.

In the previously described arrangement, the series of numbers included all the possible numbers having a specified number of digits or denominational orders. Thus, the series for $n=4$ included all sixteen of the possible four digit binary numbers arranged in series having the above-described properties wherein the last digit of the preceding three numbers and the last digit of the number in question are the same as the digits of the number in question. Series of numbers having the above-described properties need not include all of the possible numbers having a specified number of digits. In general, for numbers having $n$ digits, one or more series of numbers exists for series of numbers having any number from $n$ to $2^n$ of numbers in the series. Thus, for $n$ equal to four it is possible to arrange at least thirteen different series of numbers, each having a different number of numbers in the series from four numbers to sixteen numbers. In addiiton, in general, it is usually possible to arrange numbers in more than one series having a given number in the series. For example, the following Table C shows the last digits of various series of numbers in which any number of numbers from four to sixteen may be included in any one of the series. Furthermore, for five numbers through fifteen numbers in the series, two different series of numbers are represented and shown in the table by showing the last digits of these numbers. Table C follows:

*Table C*

| 1 | 2 | 3 |
|---|---|---|
| 4 | 1000 | |
| 5 | 11000 | 10000 |
| 6 | 111000 | 110000 |
| 7 | 1111000 | 1110000 |
| 8 | 11101000 | 11110000 |
| 9 | 111101000 | 111010000 |
| 10 | 1111011000 | 1111010000 |
| 11 | 11101011000 | 11110110000 |
| 12 | 111011001000 | 111010110000 |
| 13 | 1111011001000 | 1110110010000 |
| 14 | 11101100101000 | 11110110010000 |
| 15 | 111101100101000 | 111011001010000 |
| 16 | ---------------- | 1111011001010000 |

Column 1 shows the number of numbers in a series. Column 2 shows the last digits of a binary number having the above described properties for uniquely identifying each one of the numbers in a series. Column 3 shows the last digits of a different series of binary numbers which may also be employed to identify each of the numbers of the series.

The various series of numbers shown in Table C merely illustrate that such different series of numbers exist. The series of numbers shown in Table C are not inclusive because numerous other series of numbers having the above-described properties for given numbers of numbers in the series also exist.

The various series of numbers represented by the last digits in both columns 2 and 3 have additional useful properties in identifying storage spaces, words or items. Each of the series of numbers has the same first number and the first two digits of the second number the same and the first digit of the third number the same. Likewise, the last digit of the third number from the end is the same, the last two digits of the second number from the end is the same, and the last three digits of the last number in each of the series are of the same. Consequently, each series of numbers may be repeated any number of times in an endless tape and in addition, one series of a given number of numbers in the series may be followed by any other series of the numbers represented by the last digits in columns 2 and 3 and the entire resulting combined series of numbers has the above-described properties wherein the last digit of the three preceding numbers and the last digit of the number in question are the same as the digits of the number in question. Thus, it is possible to divide up storage spaces or items into different series having different numbers of items, words or spaces in each series and still identify the individual items in each series by a single digit appended to each item. These digits are then entered in a shift register one after another and the setting of the various stages of the shift register at all times identifies predetermined ones of the storage items in a series.

In this case, however, it is also necessary to in some manner individually uniquely identify each of the series of items. Such identification may be by another series of digits entered in each one of the words, storage spaces or slots and these second series of digits supplied to another shift register the various stages of which again uniquely identify each of the series of storage items.

Such a more comprehensive storage and identifying scheme is shown in Figs. 5, 6, 7 and 8 with Fig. 5 arranged to the left of Fig. 6. Figs. 7 and 8 show circuit details of suitable diode matrix networks overutilizing the output of the shift registers represented in Fig. 5. As shown in the upper left-hand portion of Fig. 5, eight different groups of spaces designated A to H are shown around the drum. Likewise, an identifying track 123 is shown wherein the binary numerals entered into this track have been written in the track space. The various series of numbers shown in column 511 are different than the various series of numbers represented in Table C but have similar properties.

As illustrated in Fig. 5 the A space comprises four lines or slots, the B and C spaces each comprise five lines or slots, the D space eleven lines, the E space four lines, the F space sixteen lines, the G space five lines and the H space eleven lines. Again, in column 511 the number identifying the line or slot is shown. The number identifying the slot in this case comprises the number having the binary digits recorded in the preceding four slots. With this arrangement the time required for the drum to move from the slot having the last digit of the number recorded in it to the next slot which is identified by the number permits more time for the switching and logic circuits to function so as to provide more time for adequately controlling the reading, recording or other functions to be performed under control of the identified slot. Likewise, the numbers defining the different spaces A through H comprise the number having the binary digits recorded in the last slot of the preceding three spaces.

As will be observed the numbers uniquely identifying each of the slots of the four-digit slot area may be repeated if it is desired to provide two or more such areas adjacent one another. By merely repeating the four numbers or digits in the identifying track for these adjacent areas having four slots therein, the slots 1 through 4 in each of the areas may be identified.

It is also possible to place an area having five slots immediately adjacent either before or after one of said areas having four slots, as will be apparent by observing the numbers in the B area. It is possible to place a number of these areas adjacent one another and repeat the identifying digits entered in the B areas. As shown in the drawing the B and C areas each has five slots and are located adjacent each other. The last digit in the identifying track 123 of the C area however has a zero instead of a one. This zero is placed in its track so that an 11-slot area may be placed adjacent the 5-slot area C. The digits entered into the identifying track 123 of the 11-slot area D uniquely identify each of the slots in this area and when desired a number of areas of this type may be placed adjacent one another by changing the last digit in this slot in this area to a zero instead of a one as shown in the drawing. When it is desired to go from an 11-slot area to a 4- or 5-slot area then the last digit in the identifying track will be a one as shown in the drawing. As shown in the drawing, the 4-slot area immediately follows the 11-slot area D. Following the 4-slot area E a 16-slot area F is shown.

When desired a plurality of sixteen areas F may be located adjacent each other in which case the digits entered into the identifying track 123 will be repeated as shown in the area F. The following area F at 5-slot area G is shown. This in turn is followed by another 11-slot area and then in turn will be followed by the 4-slot area A. In each case the digits in the identifying track uniquely identify each of the slots within the given area. However, with only a 4-digit number it is not possible to uniquely identify each of the slots around the drum. The slots are only uniquely identified within each area. In order to identify the areas a second identifying track is provided designated 510 in Fig. 5. A single digit is entered in this track in each of the areas and since eight areas are shown in three digits preceding the area in question are employed to uniquely identify each of the areas. Thus by a combination of the digits entered into each of the two identifying tracks 123 and 510 the individual slots are uniquely identified, first by slot number within the area and then by means of an area number. If it is desired to increase either the maximum number 16 of slots within an area or the number of areas around the drum, then it would be necessary to increase either the number of digits employed to identify the slots in each of the areas or else it will be necessary to increase the number of digits employed to identify the different areas. In either case, however, it is only necessary to provide one digit in track 123 for each slot and one digit in track 510 for each of the areas. The related shift registers and other circuits and gates necessary to so identify each slot and control equipment in accordance with the digits entered into the two identifying tracks 123 and 510 are represented in Figs. 5, 6 and 7.

As pointed out above, in the specific embodiment of the invention shown in Figs. 5, 6 and 7, the digits of the number identifying given slot in the drum are recorded in the four preceding slots in the identifying track 123. Thus, the number 0110 identifies the first line or slot of space D as shown in Fig. 5. These digits are recorded in the preceding four slots in space C. By recording the digits for the preceding four spaces, more time is allowed for the various drum circuits to function so that they will be ready to control the information recorded in the first slot of space D or to respond to such information previously recorded in the slot. The information recorded in the various slots, as for example the first slot in space D, will be in other tracks around the drum which tracks are scanned by other pick-up devices or slots and have associated with them other amplifiers and control circuits. Thus, when the digit 0 for the last slot of space C is read into the slot shift register 514 through the delay device 521, the shift register 514 responds to this digit in sufficient time so that the output of the shift register assumes the representations of 0110 at about the beginning of the first slot in space D. Thus, the digits recorded in the identifying track 123 when entered into the slot shift register 514 cause the output of this shift register to change and represent the number identifying each of the slots in each of the spaces at about the time the slot in question starts to pass under the various pick-up devices for reading and writing in that slot. Thus, in this manner ample time is provided for controlling the associated circuits so that they will be substantially ready at the time that the slot in question passes under the various pick-up heads for reading and writing in the slots.

With respect to the space identification, it should be noted that the number identifying each of the spaces is recorded in the last slot of the preceding three spaces where eight different spaces are provided as shown in the embodiment shown in Figs. 5, 6, 7 and 8. In this case, however, it is only necessary to enter a digit in one of the slots of each of the spaces so that it is desirable to provide suitable gating means on the output of the pick-up amplifier 513, which is employed to amplify the voltages representing the various digits of the space identifying number, that it, for amplifying the output from track 510. In this manner, the other spaces in the track 510 in each of the spaces may be employed for recording other information. It will be observed that the number identifying the first slot in spaces A, B, C, E, F and G is 0110, while the number identifying the first slot in spaces D and H is 0110. Thus, it is desirable to gate the output of amplifier 513 into the space shift register 515 at only these times. For this purpose, an "and" gate circuit 523 is connected to the output leads of the slot shift register 514 so that the gate circuit 523 will have a positive output when the number 0110 is entered in the shift register 514. This positive output passes through the gate circuits 524, 516 and 517 and first causes a shift pulse to be applied to the space shift register 515. After a one has also been read by the pick-up device of track 510, then a one is also entered in the space shift register 515. Thus, at the beginning of space E, the first slot of said space is identified by the number 0111 read from the previous four slots in channel 123 in space D, with the result that a positive shift pulse is obtained from gates 523, 524 and 516 from the read synchronizing source 105 after it is passed through the delay device 518. A short interval of time later, a positive pulse from the one read in the last slot of channel 510 in space D is transmitted through the delay device 522 and the gate 517 causes a one to be entered in the space shift register. The fractions shown in the delay device 522 as well as in the other delay devices shown in Fig. 5 represent the delay intervals of the respective delay devices in terms of the shown fraction of the interval between corresponding parts of adjacent pulses. Thus at about the time the first slot of the E space starts to pass under the pick-up devices, the output of the space shift register 515 is changed to represent the number 011 identifying space E as shown in the exemplary embodiment of Fig. 5. In a similar manner, the space shift register is advanced near the beginning of each of the spaces A, B, C, E, F and G.

The first slot in spaces D and H is identified by a number 0110 instead of 0111 so that means must be provided for advancing the space shift register 515 in response to the number 0110 in addition to the number 0111. In order to provide such means an additional "and" gate 525 is provided and connected to the output shift register 514 so that a positive output pulse is obtained from the gate circuit 525 when the shift register has recorded therein the number 0110. The output of the gate circuit 525 may thus be used to advance the space shift register 515 in the manner similar to the manner in which the output of the gate circuit 523 advances the space shift register 515. However, in this case, it is to be noted that the sixth line or slot in the F space is also identified by the number 0110. Consequently, when pick-up device and amplifier 103 is scanning the identifying track 123 of space F, it is not desirable to have the shift register 515 advance in response to the number 0110. In order to prevent such an advance, the gate 519 is connected to the output of the shift register 515 so that a positive output is obtained from gate output 515 at all times except when the shift register 515 is entered into the number 111 identifying the space F. The output of the gate 519 is transmitted through the additional "and" gate 526. Thus, the number 0110 produces a positive output from the "and" gate 525 each time it is read by the pick-up device and amplifier 103. This positive voltage is repeated by the gate 526 at all times except when a number 111 is entered in the space shift register 515. That is, all times the number 0110 is read from track 123 except in space F. The output from the gate 523 then passes through gate 524 to control the shift register 515 in the same manner as the output from gate 523. In this manner, the number 0110 identifying the first slot in spaces D and H is employed to gate the input to the shift register 515 so that this register will be properly advanced in accordance with the digits of the space identifying numbers. However, when the number 0110 is read in the center of space F, it will not cause any advance or improper operation of the shift register 515. In this manner, it is possible to have the same number recorded in different ones of the storage spaces identifying different slots in the various spaces and produce different results and effects for the control and logic circuits associated with the storage device.

The output from the slot shift register 514 and the output from the space shift register 515 are employed to control switching circuits such as the diode matrix switching circuits described above with reference to Figs. 1 and 2 in addition to controlling the various gate circuits shown in Figs. 5 and 6 and described herein.

Fig. 6 shows a group of eight devices A through H having a number of leads coming from them which leads may have either one or the other of two signal conditions applied to them by the devices A to H. These devices may be sender circuits, trunk circuits, test circuits, line circuits or any other desired type of device and each of the devices has the same number of leads coming from it as the corresponding space shown in Fig. 5 has slots. Each of these conductors extends to a corresponding scanner having the same number of input conductors and one output conductor. These scanners are all controlled by the output from the slot shift register 514 in the manner similar to that described above with reference to the reading shift register shown in Figs. 1 and 2 and 3 and 4. The various scanners are similar to those described above with reference to Figs. 1 and 2. Fig. 6 shows details of the 4- and 5-point scanners. The 16-point scanner is shown in detail in Fig. 7 and the 11-point scanner is shown in detail in Fig. 8. Inasmuch as these scanners work in a manner similar to that described above with respect to the scanning arrangement shown in Figs. 1 and 2, the operation of these scanners under control of an output from the shift register description of their operation need not be repeated.

It is assumed that the outputs of the shift registers 514 and 515 are of a suitable impedance and have sufficient power capability of actuate the various scanners when they are all connected in parallel as indicated in Figs. 5 and 6. If the output of the shift registers is insufficient then it is only necessary to add cathode follower stages or other amplifying stages to supply sufficient power from these shift registers to actuate the various scanning and control devices and circuits. The final set "and" gate circuits 611 through 618 are actuated under control of the space shift register 515. In this case, the output from the space shift register is translated from a 3-digit binary indication to one-out-of-eight indications of predetermined polarity, which is positive in an exemplary embodiment described herein. The particular lead to which this polarity is applied actuates the corresponding "and" output gate circuits 611 through 618 so that the output of the corresponding scanner and thus the output from the corresponding device being scanned is transmitted through respective gate circuits 611 through 618 and then through the output "or" gates 602 and 603 to the output conductor 604. The output gate 604 is supplied by pulses from the read synchronizing source 105 so that spurious output is not obtained during the times the output from the shift register stages and scanners changes. As shown in the drawing the output from the source 105 is applied directly to the gate circuit 603. The other time delays shown in Fig. 5 are arranged so that the pulses from gate 602 are properly timed to pass through the gate 603. When desired the pulses from source or from gate 602 or both may be further delayed or timed by additional delay lines or devices connected in series with the input conductors to gate circuit 603.

The output from gate circuit 603 over conductor 604 may be employed to control the reading or writing of other information in the corresponding slot in the magnetic drum or may be employed to control other circuits in accordance with the information recorded in various elements of the slot being uniquely identified by the combination of digits entered into the slots of the identifying track.

Thus, substantially any number of devices each having a substantial number of outputs may be scanned in succession. That is, each of the outputs of each of the devices may be scanned in rotation or connected to an output lead at a time when a particular slot or storage portion of the surface of the magnetic drum is passing under the pick-up or recording devices associated with the drum.

The delay devices shown are employed to properly delay the signals so that they are applied to the various devices in the proper order and at the proper times.

It is to be understood that the above-described arrangements are illustrative and not restrictive of exemplary applications of the principles of this invention. Numerous other arrangements and modifications may be devised by those skilled in the art without departing from the spirit and scope of the invention.

What is claimed is:

1. A storage device having stored therein groups of signals representing information and an additional single signal having any one of a plurality of different characteristics individual to each of said groups of signals, means responsive to a predetermined number of said additional single signals for identifying each of said groups of signals representing information.

2. In combination, in a storage device for storing a plurality of groups of signals and an additional single signal having any one of a plurality of different characteristics stored with each of said groups of signals, identifying means responsive to a predetermined number of signals and means for sequentially conveying said additional single signals to said identifying means.

3. In combination, in a storage device, means for storing therein a plurality of groups of signals and a single additional identifying signal with said groups of signals, a shift register, means for successively supplying to said shift register said additional signals from predetermined ones of said groups of signals and means responsive to the output of said shift register for uniquely identifying predetermined groups of said groups of signals.

4. In combination, in a storage system means for storing a plurality of information items, means for storing individual to each of said items a single binary digit having one or the other of two different characteristics which binary digits are arranged in predetermined order, a shift register, means for supplying said binary digits to said shift register also in a predetermined order, and means responsive to the output of said shift register for uniquely identifying each of said information items.

5. In combination, in a storage system, means for storing a plurality of groups of information items in which said groups of information items comprise a plurality of different numbers of information items in the respective groups, means for storing in each of said information items a single additional binary digit having one or the other of two different characteristics, and means responsive to a predetermined number of said single additional binary digits for identifying each of said storage items uniquely within each of said groups of storage items.

6. In combination, in a storage system, means for storing a plurality of groups of information items in which a different number of information items are stored in different ones of said groups of information items and means for storing an additional single binary identifying digit with each item of said groups of storage items, and means responsive to predetermined groups of said additional single binary identifying digits in which each group of said digits has the same predetermined number of said identifying digits for identifying each of the storage items within each of said groups of storage items.

7. In combination, in a storage system, means for storing a plurality of groups of information items in different size groups, means for including with each of said information items a single identifying binary digit and an additional single group identifying binary digit in each of said groups of storage items, means responsive to a predetermined number of said single identifying binary digits included with each of said storage items for uniquely identifying the stored items within the groups of storage items, and means responsive to groups of a predetermined number of said additional single group identifying binary digits stored in said groups of items for uniquely identifying each of said groups of items.

8. In a storage system, in combination, means for storing information items in groups of different numbers of items in different ones of said groups, a single binary identifying digit stored with each of said storage items and an additional single binary digit individual to and stored with each of said groups of storage items, a first shift register, means in supplying said identifying digits to said first shift register in a predetermined order, means responsive to the output of said shift register for uniquely identifying the various storage items within each of said groups of storage items, a second shift register, and means for supplying said additional binary digits to said second shift register in a predetermined order, means responsive to the output of said additional shift register for uniquely identifying each of said groups of storage items.

9. In a storage system, storage means for storing a plurality of information items, identifying multidigit numbers for identifying each of said information items arranged in a predetermined order in which a predetermined one of the digits of each of said numbers when read in a predetermined order from number to number comprises the same digits as predetermined ones of said numbers, a single identifying digit comprising said predetermined digits of respective ones of said numbers stored with each of a plurality of said information items, an identifying circuit, means for conveying a predetermined number of predetermined ones of said identifying digits stored with different ones of said storage items to said identifying circuit, means responsive to the output of said identifying circuit for identifyng a predetermined one of said storage items.

10. In combination, means for storing a plurality of symbols in succession comprising first means responsive to a predetermined plurality of said stored symbols, other means responsive to a lesser number of the last stored of said symbols, comparing means interconnected with said first responsive means and with said other responsive means for comparing said predetermined plurality of stored symbols to which said first means is responsive and said lesser number of last stored symbols to which said other means is responsive for controlling character of the next symbol to be stored.

11. In combination in a storage system, means for successively entering a single digit in each of a plurality of storage slots for identifying predetermined storage items, comprising means reponsive to each successive predetermined number $n$ of said stored digits, other means responsive to the $n-1$ of said digits last stored, coincident means connected between said responsive means for controlling the character of the digit to be recorded in the next storage slot.

12. In combination, means for storing predetermined series of digits one in each of a plurality of storage spaces for identifying said storage spaces comprising a first shift register in which each $n$ of successive ones of said stored digits are successively entered, a second shift register in which $n-1$ of said digits are entered concurrently with the storage thereof in a storage slot, means for comparing the digits recorded in said two shift registers, and means for recording an additional digit in a succeeding storage slot when the digits stored in predetermined stages of said shift registers are the same.

13. In combination in a storage device including a plurality of storage spaces for storing a corresponding plurality of information items, means for entering a single identifying digit in each of said storage spaces, means for generating $2^n$ different sequences of $n$ different digits where $n$ is any positive integer greater than zero comprising a first shift register having $n$ stages, a second shift register having $n-1$ stages, means for successively entering digits of said stored identifying digits in said first shift register, means for concurrently entering each of said digits in one of said storage spaces and in said second shift register, means for comparing the digits entered in said second shift register with the digits entered in predetermined stages of said first shift register, means for entering an additional one of said identifying digits of a predetermined character in the succeeding one of said storage spaces and in said second shift register when the resulting combination of the preceding $n-1$ digits and the digit to be recorded has not been previously stored in said storage spaces.

14. In combination in a storage device including a plurality of storage spaces for storing a corresponding plurality of information items, means for entering a single identifying digit in each of said storage spaces, means for generating $2^n$ different sequences of $n$ different digits where $n$ is any positive integer greater than zero comprising a first shift register having $n$ stages, a second shift register having $n-1$ stages, means for successively entering digits of said stored identified digits in said first shift register, means for concurrently entering each of said digits in one of said storage spaces and in said second shift register, means for comparing the digits entered in said second shift register with the digits entered in predetermined stages of said first shift register, means for entering an additional one of said identifying digits of one character in the succeeding one of said storage spaces and in said second shift register when the resulting combination of the preceding $n-1$ digits and the digit to be recorded has not been previously stored in said storage spaces, means for recording a digit of a different character when said previous combination of $n$ digits have been previously recorded in said storage spaces.

15. In combination, in a storage system, means for storing a plurality of storage items, means for storing with each of said storage items a single identifying binary digit having one or the other of two different characteristics, an identifying circuit for uniquely identifying each of said storage items, and means for substantially simultaneously applying to said identifying circuit a predetermined number of said binary digits stored with different ones of said storage items.

16. In a storage system, storage means for storing a plurality of information items, identifying multi-digit numbers for uniquely identifying each of said information items arranged in a predetermined order in which a predetermined one of the digits of each of said numbers when read in predetermined order from number to number comprises the same digits as predetermined ones of said numbers, a single identifying digit comprising said predetermined digit of respective ones of said numbers stored with a plurality of said information items, an identifying circuit for uniquely identifying each of said information items, and means for substantially simultaneously applying to said identifying circuit groups of a predetermined number of said identifying digits from predetermined different ones of said information items.

17. In combination, in a storage system, means for successively entering a single digit having any one of a plurality of different characteristics in each of a plurality of storage slots for uniquely identifying each of a plurality of said storage slots, an identifying circuit for uniquely identifying each of said storage slots, and means for substantially simultaneously applying to said identifying circuit groups of said single digits from predetermined different ones of said storage slots.

18. In combination, in a storage system, means for successively entering a single digit having any one of a plurality of different characteristics in each of a plurality of storage slots for uniquely identifying each of a plurality of said storage slots, an identifying circuit for uniquely identifying each of said storage slots, means for substantially simultaneously applying to said identifying circuit groups of said single digits from predetermined different ones of said storage slots, a plurality of selectable items, and means responsive to said identifying circuit for selecting one of said selectable items in response to the substantially simultaneous application of each of said groups of digits to said identifying circuit.

19. In combination, a storage device, means for storing a plurality of groups of signals therein and a single additional identifying signal having any one of a plurality of different characteristics with each of said groups of signals, a shift register, means for successively applying to said shift register said additional signals from predetermined ones of said groups of signals, a plurality of selectable devices each individual to the corresponding one of a plurality of said groups of stored signals, and means responsive to said shift register for selecting predetermined ones of said selectable items in responsive groups of identifying signals supplied to said shift register.

20. In a storage system, means for storing a plurality of information items, identifying multidigit numbers for uniquely identifying each of said information items arranged in a predetermined order in which a predetermined one of said digits of each of multidigit numbers when read in a predetermined order from number to number comprise the same digits as predetermined ones of said numbers, a single identifying digit comprising said predetermined digits of respective ones of said numbers stored with each of a plurality of said information items, an identifying circuit, means for sequentially conveying predetermined ones of said identifying digits stored with respective ones of said storage items to said identifying circuit, a plurality of selectable devices, means for selecting predetermined ones of said selecting devices in response to predetermined groups of a predetermined number of said identifying digits sequentially conveyed to said identifying circuit.

21. In combination, in a storage system, means for storing a plurality of information items, each item of which comprises a plurality of signals, a plurality of output terminals, means for delivering to said output terminals a plurality of signals from respective ones of said information items substantially simultaneously, means for storing an additional single binary digit having one or the other of two different characteristics individual to each of said storage items, an additional output terminal for said storage system, means for delivering to said additional output terminal said additional signal concurrently with the delivery of said plurality of storage signals to said plurality of output terminals, means responsive to a predetermined number of said additional single binary digits delivered to said additional output terminal for uniquely identifying predetermined ones of said storage items.

22. In combination, in a storage system, means for storing a plurality of groups of signals, a plurality of output terminals, means for substantially simultaneously conveying to said output terminals the signals from respective ones of said groups, means for storing a single additional identifying signal having any one of a plurality of different characteristics with each of said groups of stored signals, an additional output terminal, means for conveying said additional signal to said additional output terminal concurrently with the conveying of respective groups of said stored signals to said plurality of output terminals, a shift register connected to said additional output terminal responsive to said identifying signals, means responsive to the output of said shift register for uniquely identifying each of the groups of storage signals substantially simultaneously delivered to said plurality of output terminals.

23. In combination, in a storage system, means for storing a plurality of information items each item of which comprises a plurality of signals, a plurality of output terminals, means for conveying to said output terminals the signals of each of said groups substantially simultaneously and the signals from successive ones of said groups in succession, means for storing with each of said groups a single identifying signal having any one of a plurality of different characteristics, a single additional output terminal, means for conveying to said single additional output terminal the single identifying signal stored with one of said groups of signals concurrently with the conveying of the signals of one of said information items to said plurality of output terminals, means substantially simultaneously responsive to a predetermined number of said single identifying signals for uniquely identifying one of said storage items.

24. In combination, in a storage system, means for storing a plurality of information items each item of which comprises a plurality of signals, a plurality of output terminals, means for conveying to said output terminals the signals of each of said groups substantially simultaneously and the signals from successive ones of said groups in succession, means for storing with each of said groups a single identifying signal having any one of a plurality of different characteristics, a single additional output terminal, means for conveying to said single additional output terminal the identifying signal stored with one of said groups of signals concurrently with the conveying of the signals of one of said information items to said plurality of output terminals, a plurality of selectable devices, means connected to said single additional output terminal responsive to a predetermined number of said single identifying signals for selectively establishing an electrical circuit path to one of said selectable devices.

25. In combination, in a storage system, means for storing a plurality of groups of signals, a plurality of output terminals, means for substantially simultaneously delivering to said output terminals the signals of respective ones of said groups, means for storing a single additional identifying signal with each of said groups of stored signals, an additional output terminal, means for conveying said additional signal to said additional output terminal concurrently with the delivery of respective groups of said stored signals to said plurality of output terminals, a shift register connected to said additional output terminal responsive to said identifying signals, means responsive to the output of said shift register for uniquely identifying each of the groups of storage signals substantially simultaneously delivered to said plurality of output terminals, a selectable device individual to each of said groups of stored signals, means connected to said shift register and responsive to a plurality of said identifying signals received by said shift register for selectively establishing electrical circuit paths to predetermined ones of said selectable devices.

26. In combination, a magnetic drum having a plurality of slots around the surface of said drum, a plurality of recording devices located adjacent to surfaces of said drum for changing the magnetic condition of said surface in accordance with information to be stored in said drum, a plurality of pickup devices responsive to the magnetic condition of the surface of said drum, an identifying pickup device located adjacent the surface of said drum responsive to a single binary bit stored in each of the slots around the surface of said drum, a shift register connected to said identifying pickup device, and means responsive to the output of said shift register for uniquely responding to each of said slots around the surface of said drum.

27. In combination, a magnetic drum having a plurality of slots around the surface of said drum, a plurality of recording devices located adjacent to surfaces of said drum for changing the magnetic condition of said surface in accordance with information to be stored in said drum, a plurality of pickup devices responsive to the magnetic condition of the surface of said drum, an identifying pickup device located adjacent the surface of said drum responsive to a single binary bit stored in each of the slots around the surface of said drum, a shift register connected to said identifying pickup device, a selectable device individual to each of the slots on said drum, and means responsive to the output of said shift register for selectively establishing an electrical circuit path to corresponding ones of said selectable devices.

28. In combination, a continuously rotating magnetic drum having a plurality of storage slots located on its surface, a plurality of recording and pickup coils located adjacent said surface for changing and responding to the magnetic condition of small areas of the surface of said drum, an identifying recording and pickup device located adjacent said surface, means for generating $2^n$ different sequence of $n$ different digits where $n$ is any positive integer greater than zero including a first shift register having $n$ stages, a second shift register having $n-1$ shift stages, means including connections between said identifying recording and pickup device and said first shift register for successively entering identifying digits stored by said identifying storage device in said first shift register, means for concurrently recording identifying digits by said identifying recording and pickup device in one of said slots on the surface of said drum and in said second shift register, means for comparing the digits entered in said second shift register with the digits entered in predetermined stages of said first shift register, means controlled by said comparing means for energizing said identifying recording and pickup device, and means controlled by said first shift register for uniquely identifying each of the storage slots on the surface of said magnetic drum.

References Cited in the file of this patent

UNITED STATES PATENTS

| | | |
|---|---|---|
| 2,540,654 | Cohen | Feb. 6, 1951 |
| 2,549,071 | Dusek | Apr. 17, 1951 |
| 2,679,638 | Bensky | May 25, 1954 |
| 2,714,843 | Hooven | Aug. 9, 1955 |
| 2,721,990 | McNaney | Oct. 25, 1955 |